(12) United States Patent
Wang et al.

(10) Patent No.: US 11,799,773 B2
(45) Date of Patent: *Oct. 24, 2023

(54) EVPN PACKET PROCESSING METHOD, DEVICE, AND SYSTEM

(71) Applicant: Huawei Technologies Co., Ltd., Shenzhen (CN)

(72) Inventors: Haibo Wang, Beijing (CN); Shunwan Zhuang, Beijing (CN); Qiao Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,012

(22) Filed: Jun. 6, 2022

(65) Prior Publication Data

US 2022/0360527 A1 Nov. 10, 2022

Related U.S. Application Data

(63) Continuation of application No. 16/570,795, filed on Sep. 13, 2019, now Pat. No. 11,394,644, which is a
(Continued)

(30) Foreign Application Priority Data

Mar. 14, 2017 (CN) .......................... 201710151472.0

(51) Int. Cl.
*H04L 45/00* (2022.01)
*H04L 12/46* (2006.01)
*H04L 12/66* (2006.01)

(52) U.S. Cl.
CPC .......... *H04L 45/66* (2013.01); *H04L 12/4679* (2013.01); *H04L 12/66* (2013.01)

(58) Field of Classification Search
CPC ... H04L 12/46; H04L 12/4679; H04L 12/462; H04L 12/4645; H04L 12/4629;
(Continued)

(56) References Cited

U.S. PATENT DOCUMENTS 8,953,590 B1 * 2/2015 Aggarwal ........... H04L 12/4675
370/409
9,019,814 B1 * 4/2015 Mohanty ................. H04L 45/00
370/219
(Continued)

FOREIGN PATENT DOCUMENTS

CN 104365066 A 2/2015
CN 104954255 A 9/2015
(Continued)

OTHER PUBLICATIONS

Sajassi, A., Ed., et al., "BGP MPLS Based Ethernet VPN," draft-ietf-l2vpn-evpn-11, Oct. 18, 2014, 52 pages.
(Continued)

*Primary Examiner* — Redentor Pasia
(74) *Attorney, Agent, or Firm* — Conley Rose, P.C.

(57) ABSTRACT

A method includes a first provider edge (PE) device sending, to a second PE device, a media access control (MAC) route learned from a customer edge (CE) device and a virtual local area network (VLAN) identifier, wherein the second PE device generates a MAC forwarding entry based on the MAC route and the VLAN identifier, where the MAC forwarding entry is used to directly forward, using the CE device, a packet whose destination MAC address is the CE device or a MAC address of a terminal device accessing the CE device. An outbound interface identifier included in the MAC forwarding entry is an identifier of an interface connected to the CE device.

20 Claims, 12 Drawing Sheets

Related U.S. Application Data continuation of application No. PCT/CN2017/115821, filed on Dec. 13, 2017.

(58) Field of Classification Search
CPC ......... H04L 45/66; H04L 45/02; H04L 45/22; H04L 45/245; H04L 45/26
See application file for complete search history.

(56) References Cited

U.S. PATENT DOCUMENTS

| | | |
|---|---|---|
| 9,019,973 B1 | 4/2015 | Shukla et al. |
| 9,860,169 B1 | 1/2018 | Ninan et al. |
| 10,142,129 B1 | 11/2018 | Gupta et al. |
| 10,644,991 B2 | 5/2020 | Li et al. |
| 10,666,500 B2 | 5/2020 | Singh et al. |
| 2008/0170578 A1 | 7/2008 | Ould-Brahim |
| 2009/0037607 A1 | 2/2009 | Farinacci et al. |
| 2013/0148657 A1 | 6/2013 | Salam et al. |
| 2013/0301472 A1* | 11/2013 | Allan .................. H04L 69/08 370/254 |
| 2014/0029419 A1 | 1/2014 | Jain et al. |
| 2014/0226531 A1 | 8/2014 | Farkas et al. |
| 2014/0233369 A1 | 8/2014 | Salam et al. |
| 2015/0003458 A1 | 1/2015 | Li et al. |
| 2015/0081869 A1 | 3/2015 | Wang et al. |
| 2016/0191374 A1 | 6/2016 | Singh et al. |
| 2016/0261487 A1* | 9/2016 | Singh .................. H04L 45/70 |
| 2017/0171057 A1 | 6/2017 | Dong et al. |
| 2017/0195210 A1* | 7/2017 | Jacob .................. H04L 69/321 |
| 2017/0207960 A1* | 7/2017 | Boutros ................. H04L 41/12 |
| 2017/0250904 A1* | 8/2017 | Singarayan ......... H04L 12/4641 |
| 2017/0331641 A1* | 11/2017 | Fu ....................... H04L 12/4679 |
| 2017/0373973 A1* | 12/2017 | Bickhart ............... H04L 45/741 |
| 2018/0006995 A1* | 1/2018 | Bickhart ............... H04L 61/103 |
| 2018/0176028 A1* | 6/2018 | Tiruveedhula .......... H04L 45/02 |
| 2018/0287990 A1 | 10/2018 | Bickhart et al. |
| 2018/0302321 A1* | 10/2018 | Manthiramoorthy ....................... H04L 12/4641 |
| 2019/0149462 A1 | 5/2019 | Semwal |

FOREIGN PATENT DOCUMENTS

| | | |
|---|---|---|
| CN | 105743689 A | 7/2016 |
| EP | 2991284 A1 | 3/2016 |
| WO | 2012018521 A1 | 2/2012 |
| WO | 2015032261 A1 | 3/2015 |

OTHER PUBLICATIONS

Kekekeke, "[Huawei Yueduhui] Technology Enthusiast: EVN," retrieved from internet: https://support.huawei.com/huaweiconnect/enterprise/zh/thread-335619.html, Nov. 26, 2015, 65 pages.

Rosen, E., et al., "BGP/MPLS IP Virtual Private Networks (VPNs)," RFC 4364, Feb. 2006, 47 pages.

Sajassi, A., Ed., et al., "BGP MPLS-Based Ethernet VPN," RFC 7432, Feb. 2015, 56 pages.

Li, Z., et al., "Using BGP between PE and CE in EVPN," draft-li-l2vpn-evpn-pe-ce-01, Jul. 4, 2014, 7 pages. XP015100382.

* cited by examiner

US 11,799,773 B2

EVPN PACKET PROCESSING METHOD, DEVICE, AND SYSTEM

CROSS-REFERENCE TO RELATED APPLICATIONS

This is a continuation of U.S. patent application Ser. No. 16/570,795 filed on Sep. 13, 2019, which is a continuation of Int'l Patent App. No. PCT/CN2017/115821 filed on Dec. 13, 2017, which claims priority to Chinese Patent App. No. 201710151472.0 filed on Mar. 14, 2017, all of which are incorporated by reference.

TECHNICAL FIELD

Embodiments of this application relates to the field of communications technologies, and in particular, to an Ethernet virtual private network (EVPN) packet processing method, a device, and a system.

BACKGROUND

An Ethernet virtual private network (EVPN) is a virtual private network (VPN) technology that provides layer 2 network interconnection on a Multiprotocol Label Switching (MPLS) network. Currently, the EVPN is used as a mainstream solution for bearing a layer 2 service in network designs of major providers. In the EVPN technology, the Border Gateway Protocol (BGP) is used as a protocol of a control plane to perform Media Access Control (MAC) address learning between provider edge (PE) devices, and transfer MAC address learning and publishing processes from a conventional data plane to the control plane, thereby greatly reducing MAC address diffusion in traffic flooding, supporting a customer edge (CE) device being multihomed to the EVPN, and facilitating MAC address management to implement load sharing. In the EVPN, the CE device may be connected to the PE device in a plurality of access manners. For example, the CE device is multihomed to the EVPN through a virtual local area network (VLAN). One of important advantages of the EVPN solution is to implement multihoming of the CE device.

In a common scenario, as shown in FIG. 1, a network 100 includes a backbone network and a plurality of EVPN sites provided by a service provider. The backbone network includes a first PE device PE 1, a second PE device PE 2, a third PE device PE 3, and a plurality of Provider (P) devices (not shown in the figure). The plurality of EVPN sites include a site 1 and a site 2. The site 1 and the site 2 belong to a same EVPN 1. A terminal device A whose MAC address is MAC 1 accesses a CE 1, and the CE 1 is dual-homed to the PE 1 and the PE 2. A terminal device B whose MAC address is MAC 2 accesses a CE 2, and the CE 2 accesses the PE 3. The PE 1 learns the MAC address of the terminal device A from the CE 1. The PE 2 does not learn the MAC address of the terminal device A from the CE 1. The PE 1 sends an EVPN Media Access Control/Internet Protocol (MAC/IP) advertisement route to the PE 3 using a BGP update message, in other words, notifies the PE 3 of a MAC route that arrives at the terminal device A. Although the PE 2 does not learn MAC 1, the PE 2 may publish an EPVN Ethernet auto-discovery (A-D) route to the PE 3, and the PE 3 may learn that both the PE 1 and the PE 2 can be used to arrive at the terminal device A. In other words, the PE 3 performs load sharing in an aliasing manner. It should be noted that, in FIG. 1, an example in which the terminal device A accesses a PE device using the CE 1 is used for description. In actual networking, the terminal device A may be directly used as a CE device to access the PE device. In this case, the MAC address of the terminal device A is a MAC address of the CE device. This specification is described using an example in which the terminal device A accesses a PE device using a CE device. A solution in which a terminal device directly accesses a PE device is similar to a solution in which a terminal device accesses a PE device using a CE device. Details are not described herein again.

For more details about the MAC/IP advertisement route and the Ethernet A-D route, and details about load sharing by the PE 3 in an aliasing manner, refer to specific descriptions in the Request For Comments (RFC) 7432 published by the Internet Engineering Task Force (IETF). Details are not described herein again. However, in the existing EVPN technology, when known unicast traffic that is sent by the terminal device B and whose destination MAC address is MAC 1 arrives at the PE 3, the PE 3 performs load sharing processing on the known unicast traffic, and sends the known unicast traffic to the PE 2. Because the PE 2 does not learn the MAC address of the terminal device A from the CE 1, the PE 2 cannot directly forward the foregoing unicast traffic to the CE 1 and needs to send the traffic to the CE 1 using the PE 1. In other words, the PE 1 and the PE 2 do not effectively share load of the known unicast traffic whose destination MAC address is MAC 1. Consequently, bandwidth resources from the PE 2 to the CE 1 are wasted, and bandwidth resources from the PE 1 to the CE 1 are also consumed. In the foregoing solution, system resources are wasted, and a technical advantage of the EVPN cannot be effectively utilized.

SUMMARY

This application provides a packet processing method, in order to resolve a technical problem in other approaches where load cannot be effectively shared between a plurality of PE devices because a PE device cannot directly forward traffic to a CE device that is multihomed to the PE device.

According to a first aspect, this application provides a packet processing method, and the method is applied to an EVPN. A customer edge CE device is connected to a first interface of a first provider edge PE device over a first link, and the CE device is connected to a second interface of a second PE device over a second link. The first PE device generates a first message. The first message carries a first MAC/IP advertisement route that arrives at the CE device and a virtual local area network VLAN identifier. The first MAC/IP advertisement route includes a MAC address and an Ethernet segment identifier (ESI) used to identify an Ethernet segment (ES). The MAC address included in the first MAC/IP advertisement route is a MAC address of the CE device or a MAC address of a terminal device managed by the CE device. The ES includes the first link and the second link, and the VLAN identifier is used to indicate a VLAN to which the terminal device belongs. The first PE device sends the first message to the second PE device. The first MAC/IP advertisement route and the VLAN identifier are used by the second PE device to generate a first MAC forwarding entry. The first MAC forwarding entry includes the MAC address included in the first MAC/IP advertisement route and the VLAN identifier, an outbound interface identifier included in the first MAC forwarding entry is an identifier of the second interface, and the first MAC forwarding entry is used by the second PE device to forward, to the CE device, a packet whose destination MAC address is the MAC address included in the first MAC/IP advertisement route.

In the foregoing technical solution, when the second PE device does not learn a MAC route from the CE device and cannot obtain information about the VLAN to which the terminal device belongs, the first PE device notifies the second PE device of the MAC route learned from the CE and the VLAN identifier. The second PE device can generate the first MAC forwarding entry based on the received MAC route and VLAN identifier. When receiving a data stream whose destination MAC address is the MAC address included in the first MAC/IP advertisement route, the second PE device may directly forward the data stream to the CE device over the second link based on the first MAC forwarding entry. In the foregoing technical solution, when a CE device is multihomed to a plurality of PE devices in a multi-active manner, the plurality of PE devices can effectively share load, thereby properly utilizing bandwidth resources. Further, in the EVPN, a PE device may learn the VLAN information from the CE using a control plane. In some possible scenarios, the second PE device cannot directly learn the VLAN information from the CE device. According to the foregoing technical solution provided in this application, the second PE device may learn the VLAN information from the first PE device. Further, the second PE device may forward traffic to the CE device based on the VLAN information. For example, when the CE device accesses the second PE device using an Ethernet tag or through Ethernet tag termination, because the second PE does not directly learn the VLAN information from the CE device, the second PE device cannot obtain the VLAN information, and consequently cannot directly forward a packet to the CE device.

In an optional design, the first message is a first Border Gateway Protocol (BGP) update message, and the first BGP update message includes a VLAN attribute field used to carry the VLAN identifier. Optionally, the VLAN attribute field includes a type field and a sub-type field. A value of the type field is used to identify a type of a multiplex EVPN extended community attribute, and a value of the sub-type field indicates that the extended community attribute is a VLAN extended community attribute. The VLAN attribute field further includes a VLAN value field used to carry the VLAN identifier.

In this application, the VLAN attribute is extended in a BGP update message, thereby effectively implementing VLAN information advertisement using an existing protocol.

In an optional design, after sending, by the first PE device, the first message to the second PE device, the method further includes receiving, by the first PE device, a second message sent by the second PE device. The second message carries a second MAC/IP advertisement route, a next hop network address, and the VLAN identifier. The second MAC/IP advertisement route includes a destination MAC address and the ESI. The destination MAC address in the second MAC/IP advertisement route is the same as the MAC address included in the first MAC/IP advertisement route. The next hop network address carried in the second message is a network address of the second PE device, for example, a loopback address of the second PE device. The ESI is used by the first PE device to determine that the first PE device is connected to the CE device through the first interface. The determined first interface, the MAC address included in the second MAC/IP advertisement route, and the VLAN identifier are used by the first PE device to generate a second MAC forwarding entry. The second MAC forwarding entry includes the MAC address included in the second MAC/IP advertisement route, an outbound interface identifier included in the second forwarding entry is an identifier of the first interface, and the second MAC forwarding entry is used by the first PE device to forward an entry of a packet whose destination MAC address is the MAC address included in the second MAC/IP advertisement route. The method further includes generating, by the first PE device, a third MAC forwarding entry based on the MAC address included in the second MAC/IP advertisement route and the network address of the second PE device. The third MAC forwarding entry includes the MAC address included in the second MAC/IP advertisement route, and a next hop network address included in the third MAC forwarding entry is the network address of the second PE device. When the first link is faulty, the third MAC forwarding entry is used by the first PE device to forward an entry of a packet whose destination MAC address is the MAC address included in the second MAC/IP advertisement route.

In the foregoing solution, after generating the third MAC forwarding entry and the fourth MAC forwarding entry, the first PE device implements fast reroute FRR based on the third MAC forwarding entry and the fourth MAC forwarding entry. When the first PE device receives known unicast traffic (a data packet whose destination MAC address is the MAC address included in the second MAC/IP advertisement route), the first PE device queries a MAC forwarding table; and when the first link works normally, directly forwards the packet using the CE device according to an instruction of the third MAC forwarding entry. When the first link is faulty, after the first PE device receives the known unicast traffic, the first PE device queries the MAC forwarding table, and forwards the traffic to the second PE device according to an instruction of a secondary forwarding entry, in other words, according to an instruction of the fourth MAC forwarding entry; and the second PE device forwards the traffic to the CE device, thereby increasing a failure convergence speed.

In an optional design, the second message further carries instruction information. After the receiving, by the first PE device, a second message sent by the second PE device, the method further includes skipping sending, by the first PE device to the second PE device according to the instruction information, the VLAN identifier and a MAC/IP advertisement route that arrives at the MAC address included in the second MAC/IP advertisement route. Therefore, a packet loop can be effectively avoided.

According to a second aspect, this application provides a packet processing method, and the method is applied to an EVPN. A customer edge (CE) device is connected to a first interface of a first provider edge (PE) device over a first link, and the CE device is connected to a second interface of a second PE device over a second link. First, the second PE device receives a first message sent by the first PE device. The first message carries a first MAC/IP advertisement route and a first VLAN identifier. The first MAC/IP advertisement route includes a MAC address and an Ethernet segment identifier (ESI) used to identify an Ethernet segment (ES). The MAC address included in the first MAC/IP advertisement route is a MAC address of the CE device or a MAC address of a terminal device managed by the CE device. The ES includes the first link and the second link, and the first VLAN identifier is used to indicate a VLAN to which the terminal device belongs. Then, the second PE device determines, based on the ESI, that the second PE device is connected to the CE device through the second interface. Further, the second PE device generates a first MAC forwarding entry based on the determined second interface, the MAC address included in the first MAC/IP advertisement route, and the first VLAN identifier. The first MAC forwarding entry includes the MAC address included in the first MAC/IP advertisement route and the first VLAN identifier. An outbound interface identifier included in the first MAC forwarding entry is an identifier of the second interface. The first MAC forwarding entry is used by the second PE device to forward, to the CE device, a packet that carries the first VLAN identifier and whose destination MAC address is the MAC address included in the first MAC/IP advertisement route.

In the foregoing solution, when the second PE device does not learn a MAC route or VLAN information from the CE device, the first PE device notifies the second PE device of the MAC route learned from the CE and a VLAN identifier. The second PE device can generate the first MAC forwarding entry based on the received MAC route and VLAN identifier. When receiving a data stream whose destination MAC address is the MAC address included in the first MAC/IP advertisement route, the second PE device may directly forward the data stream to the CE device over the second link based on the first MAC forwarding entry. In the foregoing technical solution, when a CE device is multi-homed to a plurality of PE devices in a multi-active manner, the plurality of PE devices can effectively share load, thereby properly utilizing bandwidth resources. Further, in the EVPN, a PE device may learn the VLAN information using a control plane. In some possible scenarios, the second PE device cannot directly learn the VLAN information from the CE device. According to the foregoing technical solution provided in this application, the second PE device may learn the VLAN information from the first PE device. Further, the second PE device may forward, to the CE device based on the VLAN information, traffic that arrives at the terminal device. For example, when the CE device accesses a PE device using an Ethernet tag or through Ethernet tag termination, the second PE may forward a packet to the CE device based on the learned VLAN information.

In an optional design, the first message further carries a next hop network address, and the next hop network address in the first message is a network address of the first PE device, for example, a loopback address of the first PE device. The method further includes: obtaining, by the second PE device, the network address of the first PE device based on the first message; and generating, by the second PE device, a second MAC forwarding entry based on the MAC address included in the first MAC/IP advertisement route and the network address of the first PE device. The second MAC forwarding entry includes the MAC address included in the first MAC/IP advertisement route, and a next hop network address included in the second MAC forwarding entry is the network address of the first PE device. When the second link is faulty, the second MAC forwarding entry is used by the second PE to forward the packet that carries the first VLAN identifier and whose destination MAC address is the MAC address included in the first MAC/IP advertisement route.

When the second PE device receives known unicast traffic (a data packet whose destination MAC address is the MAC address included in the first MAC/IP advertisement route), the second PE device queries a MAC forwarding table; and when the second link is in a normal working state, directly forwards the packet over the second link using the CE device according to an instruction of the first MAC forwarding entry. When the second link is faulty and the second PE device receives the known unicast traffic, the second PE device forwards the traffic to the first PE device according to an instruction of the second MAC forwarding entry; and the first PE device forwards the traffic to the CE device, thereby increasing a failure convergence speed. Further, in the EVPN, a PE device may learn the VLAN information from the CE device using the control plane. In some possible scenarios, the second PE device cannot directly learn the VLAN information from the CE device. According to the foregoing technical solution provided in this application, the second PE device may learn the VLAN information from the first PE device. Further, the second PE device may forward traffic to the CE device based on the VLAN information. For example, when the CE device accesses a PE device using an Ethernet tag or through Ethernet tag termination, the second PE device may forward the traffic to the CE device based on the VLAN information.

In an optional design, the first message is a first BGP update message, and the first BGP update message includes a VLAN attribute field used to carry the first VLAN identifier.

In this application, the VLAN attribute is extended in a BGP update message, thereby effectively implementing VLAN information advertisement using an existing protocol.

In an optional design, after generating, by the second PE device, a first MAC forwarding entry based on the determined second interface, the MAC address included in the first MAC/IP advertisement route, and the first VLAN identifier, the second PE device receives a first packet that carries a second VLAN identifier, where a destination MAC address of the first packet is the MAC address included in the first MAC/IP advertisement route. The second PE device replaces the second VLAN identifier carried in the second packet with the first VLAN identifier based on the first MAC forwarding entry, to obtain a second packet that carries the first VLAN identifier. The second PE device sends the second packet to the CE device.

In an optional design, after the receiving, by the second PE device, a first message sent by the first PE device, the method further includes: generating, by the second PE device, a second message, where the second message carries a second MAC/IP advertisement route, a next hop network address, and the first VLAN identifier, the second MAC/IP advertisement route includes a MAC address and the ESI, the MAC address included in the second MAC/IP advertisement route is the same as the MAC address included in the first MAC/IP advertisement route, and the next hop network address carried in the second message is a network address of the second PE device; and sending, by the second PE device, the second message to the first PE device, where the second message is used by the first PE device to generate a third MAC forwarding entry and a fourth MAC forwarding entry. The third MAC forwarding entry is used by the first PE device to forward a packet whose destination MAC address is the MAC address included in the second MAC/IP advertisement route, the third MAC forwarding entry includes the MAC address included in the second MAC/IP advertisement route and the first VLAN identifier, and an outbound interface identifier included in the third MAC forwarding entry is an identifier of the first interface. When the first link is faulty, the fourth MAC forwarding entry is used by the first PE device to forward a packet whose destination MAC address is the MAC address included in the second MAC/IP advertisement route, the fourth MAC forwarding entry includes the MAC address included in the second MAC/IP advertisement route, and a next hop network address included in the fourth MAC forwarding entry is the network address of the second PE device.

According to the foregoing solution, after receiving the first message, the second PE device generates, on the control plane based on information carried in the first message, a local primary MAC routing entry and a local secondary MAC routing entry that is used for fast reroute. Further, the control plane delivers the primary MAC routing entry and the secondary MAC routing entry to a forwarding plane, and generates the first MAC forwarding entry and the second MAC forwarding entry that are used for fast reroute. In addition, after receiving the first message, the second PE device generates the local first MAC forwarding entry, and then returns the local MAC route to the first PE device, such that the first PE device generates a secondary MAC routing entry used to implement fast reroute. The MAC route learned by the first PE device from the CE device may be used as a local MAC route, namely, a primary MAC route. When a link that connects the first PE device and the CE device is faulty, for example, when the first link is faulty, the local MAC route of the first PE device is cancelled. After the first link recovers, the first PE device may generate the local MAC route again based on the second MAC/IP advertisement route and the first VLAN identifier that are notified by the second PE device, in order to instruct to forward traffic to the CE device. Therefore, after the first link is faulty and recovers again, a route can be quickly redirected, and fast failure convergence can be implemented.

It should be noted that, in this application, the local MAC route of the PE device is a route used to instruct to directly forward unicast traffic to the CE device, a destination MAC address included in the local MAC route is the MAC address of the CE device or a MAC address of a terminal device accessing the CE device, and an outbound interface identifier included in the local MAC route is an identifier of an interface, connected to the CE device, of the PE device.

In an optional design, the second message further carries instruction information, and the instruction information is used to instruct the first PE device not to send, to the second PE device after the first PE device receives the second message, the first VLAN identifier and a MAC/IP advertisement route that arrives at the MAC address included in the second MAC/IP advertisement route, in order to avoid a packet loop.

According to a third aspect, this application provides a first provider edge PE device, and the first PE device is configured to perform the method in any one of the first aspect or the possible designs of the first aspect. The first PE device includes modules configured to implement the method in any one of the first aspect or the possible designs of the first aspect.

According to a fourth aspect, this application provides a second provider edge PE device, and the second PE device is configured to perform the method in any one of the second aspect or the possible designs of the second aspect. The second PE device includes modules configured to implement the method in any one of the second aspect or the possible designs of the second aspect.

According to a fifth aspect, this application provides a first PE device, and the first PE device includes an input interface, an output interface, a processor, and a memory. The input interface, the output interface, the processor, and the memory may be connected to each other using a bus system. The memory is configured to store a program, and the processor is configured to execute the program in the memory, in order to perform the method in any one of the first aspect or the possible designs of the first aspect.

According to a sixth aspect, this application provides a second PE device, and the second PE device includes an input interface, an output interface, a processor, and a memory. The input interface, the output interface, the processor, and the memory may be connected to each other using a bus system. The memory is configured to store a program, and the processor is configured to execute the program in the memory, in order to perform the method in any one of the second aspect or the possible designs of the second aspect.

According to a seventh aspect, an embodiment of this application provides a first PE device, and the first PE device includes a main control board and an interface board, and may further include a switching board. The first PE device is configured to perform the method in any one of the first aspect or the possible designs of the first aspect.

According to an eighth aspect, an embodiment of this application provides a first PE device, and the first PE device includes a controller and a first PE forwarding device. The first PE forwarding device includes an interface board, and may further include a switching board. The first PE device is configured to perform the method in any one of the first aspect or the possible designs of the first aspect. The controller includes a receiver, a processor, a transmitter, a random access memory, a read-only memory, and a bus. The processor is separately coupled to the receiver, the transmitter, the random access memory, and the read-only memory using the bus. When the controller needs to run, a basic input/output system built in the read-only memory or a bootloader in an embedded system is used to boot the system to start, and boot the controller to enter a normal running state. After entering the normal running state, the controller runs an application and an operating system in the random access memory, such that the processor executes functions of the main control board in the seventh aspect.

According to a ninth aspect, an embodiment of this application provides a second PE device, and the second PE device includes a main control board and an interface board, and may further include a switching board. The second PE device is configured to perform the method in any one of the second aspect or the possible designs of the second aspect.

According to a tenth aspect, an embodiment of this application provides a second PE device, and the second PE device includes a controller and a second PE forwarding device. The second PE forwarding device includes an interface board, and may further include a switching board. The second PE device is configured to perform the method in any one of the second aspect or the possible designs of the second aspect. The controller includes a receiver, a processor, a transmitter, a random access memory, a read-only memory, and a bus. The processor is separately coupled to the receiver, the transmitter, the random access memory, and the read-only memory using the bus. When the controller needs to run, a basic input/output system built in the read-only memory or a bootloader in an embedded system is used to boot the system to start, and boot the controller to enter a normal running state. After entering the normal running state, the controller runs an application and an operating system in the random access memory, such that the processor executes functions of the main control board in the seventh aspect.

According to an eleventh aspect, an embodiment of this application provides a communications system, and the communications system includes the first PE device according to any one of the third aspect, the fifth aspect, the seventh aspect, or the eighth aspect, and the second PE device according to any one of the fourth aspect, the sixth aspect, the ninth aspect, or the tenth aspect.

According to a twelfth aspect, an embodiment of this application provides a computer readable storage medium or a computer program product, configured to store a computer program. The computer program is configured to perform the method in any one of the first aspect, the second aspect, the possible designs of the first aspect, or the possible designs of the second aspect.

According to the method, the device, and the system provided in embodiments of this application, when a CE device is multihomed to PE devices in a multi-active manner in the EVNP, load can be effectively shared between the PE devices connected to the CE device, and system bandwidth resources are properly used.

BRIEF DESCRIPTION OF DRAWINGS

To describe the technical solutions in the embodiments of this application more clearly, the following briefly describes the accompanying drawings required for describing the embodiments.

DESCRIPTION OF EMBODIMENTS

The following describes technical solutions in the embodiments of this application with reference to accompanying drawings. Network architectures and service scenarios described in the embodiments of this application aim to more clearly describe the technical solutions in the embodiments of this application, but are not intended to limit the technical solutions provided in the embodiments of this application. A person of ordinary skill in the art may know that as the network architectures evolve and a new service scenario emerges, the technical solutions provided in the embodiments of this application can also be applied to resolving similar technical problems.

The technical solutions described in this application may be applied to a BGP MPLS-based EVPN. In the EVPN technology, a mechanism similar to a BGP/MPLS Internet Protocol (IP) VPN is used. The BGP is extended, and extended reachability information is used, such that MAC address learning and publishing processes between layer 2 networks of different sites are transferred from a data plane to a control plane. A MAC address is learned on the control plane to implement a layer 2 (L2) VPN (L2VPN) function. Learning the MAC address on the control plane can resolve problems caused by learning the MAC address on the data plane, such as difficult implementation of network device multihoming and unsupported load sharing.

A CE device may be multihomed to the EVPN over an Ethernet link. Multihoming of one CE device in deployment means that the CE device is separately connected to a plurality of network-side devices over a plurality of links.

Figure 1:
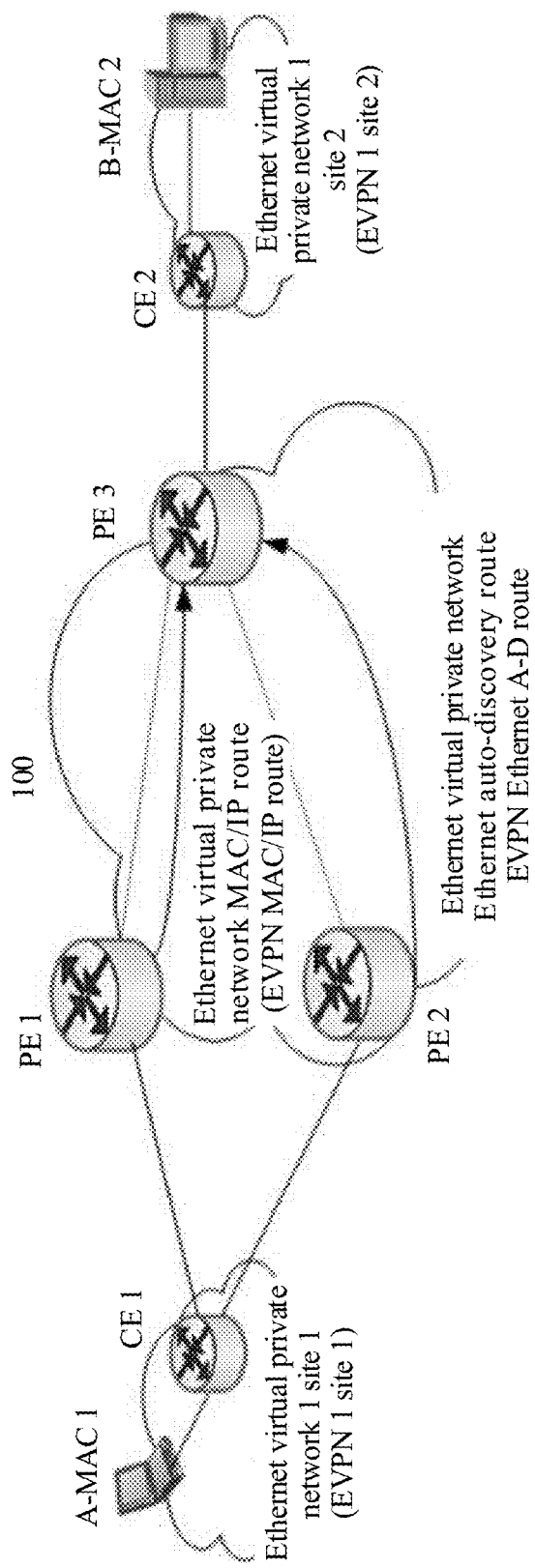
FIG. 1 is a schematic diagram of an EVPN application scenario.
Figure 2:
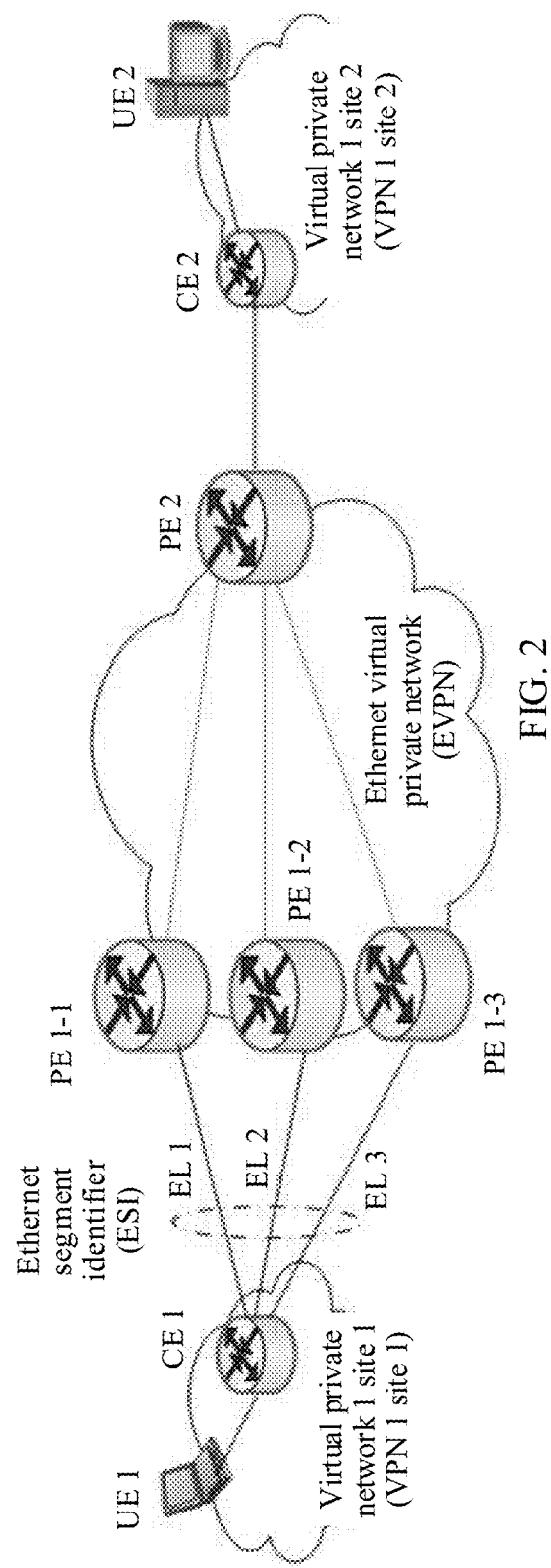
FIG. 2 is a schematic diagram of an application network scenario of a packet processing method according to an embodiment of this application.

FIG. 2 illustrates a typical scenario of multihoming to an EVPN over Ethernet links in a multi-active manner. As shown in FIG. 2, the EVPN includes four PE devices: a PE 1-1, a PE 1-2, a PE 1-3, and a PE 2. A CE 1 is connected to the PE 1-1, the PE 1-2, and the PE 1-3 over an Ethernet link (EL) 1, an EL 2, and an EL 3 respectively. One Ethernet link set including these three Ethernet links is an Ethernet segment (ES). An Ethernet segment identifier (ESI) is a unique non-zero identifier used to identify the ES.

The PE 1-1 learns a MAC address of user equipment (UE) 1 in a site 1 of a VPN 1, for example, MAC A. The PE 1-1 publishes a MAC/IP advertisement route to the PE 2 using a BGP update message. The PE 1-2 does not learn the MAC address of the UE 1. The PE 1-2 publishes an Ethernet auto-discovery (A-D) route to the PE 2. Therefore, the PE 2 learns, in an aliasing manner, that the PE 2 may arrive at the UE 1 using the PE 1-1, and that the PE 2 may arrive at the UE 1 using the PE 1-2. Therefore, when unicast traffic sent by UE 2 to the UE 1 is transmitted by the PE 2, the PE 2 may perform load sharing processing on the unicast traffic. The unicast traffic is forwarded to the CE 1 using the PE 1-1 and the PE 1-2, thereby implementing interworking between the UE 1 and the UE 2 in the VPN 1.

In the deployment scenario of multihoming over Ethernet links, the EVPN supports a plurality of redundancy modes. The plurality of redundancy modes include a single-active redundancy mode, a multi-active redundancy mode, and an all-active redundancy mode. The single-active redundancy mode (or a single-active mode for short) indicates that only one Ethernet link in an Ethernet link segment is in an active state, and one or more other Ethernet links are in an inactive state. The active state means that the Ethernet link may be used to carry and forward a data stream. In a primary/ secondary protection scenario, the active Ethernet link is usually used as a primary Ethernet link. Correspondingly, the Ethernet link may be in an inactive state. The inactive state means that the Ethernet link cannot be used to carry or forward a data stream, and the inactive Ethernet link is usually used as a secondary Ethernet link. When the primary Ethernet link is faulty, the secondary Ethernet link becomes active to carry and forward a data stream. Therefore, a deployment scenario in the single-active mode may include single-active deployment (only one EL exists in the ES), single-active single-standby deployment (two ELs exist in the ES, one EL is in an active state, and the other EL is in an inactive state), and single-active multi-standby deployment (at least three ELs exist in the ES, one EL is in an active state, and at least two other ELs are in an inactive state). Further explanations are provided with reference to FIG. 2. If only one Ethernet link EL 1 in the ES is active and used as a primary EL, and other EL 2 and EL 3 are inactive and used as backup ELs, such a redundancy mode is a single-active dual-standby mode (belonging to a single-active multi-standby mode).

In the deployment scenario of multihoming over Ethernet links, the all-active redundancy mode (or an all-active mode for short) indicates that all Ethernet links in an Ethernet link segment are in an active state. In other words, there is no inactive Ethernet link. All these active Ethernet links may forward a data stream in a load sharing manner, in order to provide a transmission capability with higher bandwidth. However, backup is not supported in a scenario of the all-active mode. In other words, there is no secondary Ethernet link. When one or more primary Ethernet links are faulty, no secondary Ethernet link can be used for redundancy protection. Further explanations are provided with reference to FIG. 2. If all three Ethernet links EL 1, EL 2, and EL 3 in the ES are active and no backup EL exists, such a redundancy mode is the all-active mode.

In the deployment scenario of multihoming over Ethernet links, the multi-active redundancy mode (a multi-active mode for short) indicates that some Ethernet links in an Ethernet link segment are in an active state, and the other Ethernet links are in an inactive state. These active Ethernet links (used as primary Ethernet links) may forward a data stream in a load sharing manner, in order to provide a transmission capability with higher bandwidth. The other inactive Ethernet links are used as backup Ethernet links. When one or more primary Ethernet links are faulty, these secondary Ethernet links may become active for redundancy protection. Further explanations are provided with reference to FIG. 2. If two Ethernet links EL 1 and EL 2 in the ES are in an active state, and an EL 3 is in an inactive state, the EL 1 and the EL 2 are combined to forward a data stream in a load sharing manner, and the EL 3 provides the EL 1 or the EL 2 with backup protection.

For more details about the MAC/IP advertisement route and the Ethernet A-D route and for a method in which the PE 2 performs load sharing in an aliasing manner, refer to the RFC 7432. Related content of this document is incorporated in this application by reference. For brevity, details are not described herein again.

In the scenario shown in FIG. 2, traffic sent by a CE device to a PE device is routed using a hash algorithm, and implementation of the hash algorithm depends on the CE device. An implementation of the CE device cannot ensure that the traffic flows through each link that connects the CE device and the PE device. For an unselected link, a PE device corresponding to the link cannot learn a MAC address of a terminal device accessing the CE device, and cannot effectively obtain VLAN information of the terminal device. For example, when the CE device uses a source MAC address and a destination MAC address as hash factors, the traffic sent by the CE device to the PE device may be hashed to a link connected to the PE 1-1. Consequently, the PE 1-2 cannot learn the MAC address of the UE 1, and no local MAC forwarding entry that arrives at the UE 1 exists on the PE 1-2. When unicast traffic whose destination MAC address is MAC A arrives at the PE 1-2, the PE 1-2 cannot directly forward the unicast traffic to the CE 1.

It should be noted that a person skilled in the art should understand that the scenario shown in FIG. 2 is merely an example and should not constitute a limitation on this application. As shown in FIG. 2, a terminal device accesses the PE device using the CE device. In an actual operation, the terminal device may serve as a CE device to access the PE device. In this case, a MAC address of the terminal device is a MAC address of the CE device. The scenario shown in FIG. 2 may be applied to a plurality of scenarios, for example, may be applied to a mobile bearer network. A typical mobile bearer network is an Internet Protocol (IP) radio access network (RAN). In the mobile bearer network, the CE device may be a base transceiver station (BTS), and the PE device may be connected to a base station controller (BSC) or a radio network controller (RNC). For another example, the EVPN Virtual Extensible LAN (VXLAN) is applied to a fixed network. In the fixed network, the CE device may be a user-side site, and the PE device may be a broadband access server (BAS).

It should be further noted that, in this application, the CE device and the PE device in this embodiment of this application may be corresponding devices defined in the RFC 7432. The PE device may be a router or a switch. The CE device may be a router, a switch, or a terminal device. When the CE device is a router, the CE device may be connected to one or more terminal devices. Usually, one side of the CE device is connected to the PE device, and another side is connected to UE, thereby transiting and connecting the user equipment to a provider network. The UE is also referred to as terminal equipment (TE) or a terminal, and may be a handheld device having a wireless communication function, an in-vehicle device, a wearable device, a computer device, a virtual machine, or another processing device connected to a wireless modem. The UE may be alternatively user equipment or a mobile station (MS).

It should be further noted that a PE and a PE device mean the same in the embodiments of this application. Likewise, a CE and a CE device mean the same. The data stream in this application may be a unicast data stream of a known MAC address.

Figure 3:
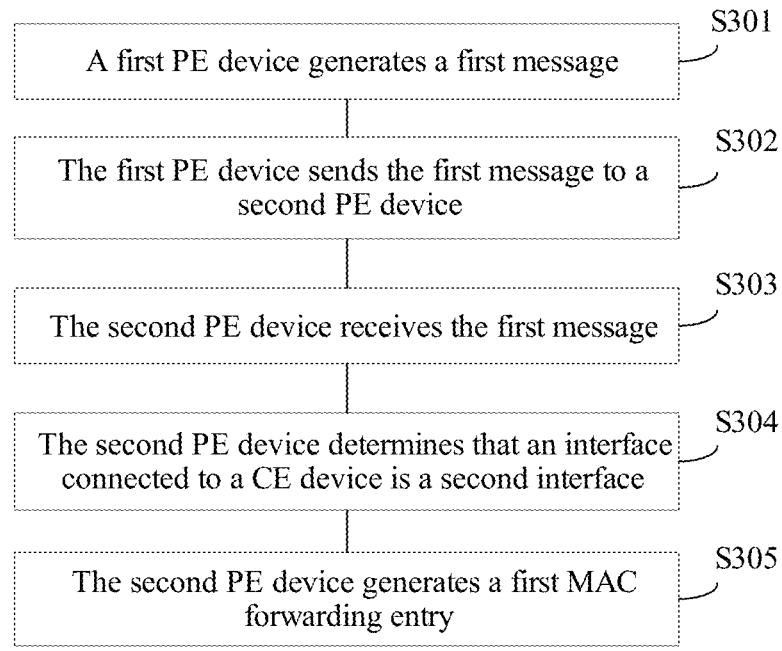
FIG. 3 is a schematic flowchart of a packet processing method according to an embodiment of this application.

FIG. 3 shows a packet processing method 300 provided in this application. The method is applied to an EVPN scenario in which a customer edge CE device separately accesses at least two PE devices over at least two links. The at least two links form one Ethernet segment, and the at least two PE devices include a first PE device and a second PE device. It should be noted that, in this application, the link may be an Ethernet link, and an identifier used to identify the Ethernet segment is an Ethernet segment identifier (ESI). The Ethernet segment may also be referred to as an Ethernet link segment or an Ethernet link set. The CE device accesses a first interface of the first PE device over a first link. The CE device accesses a second interface of the second PE device over a second link. The Ethernet segment includes the first link and the second link.

The method 300 shown in FIG. 3 may be applied to the scenario shown in FIG. 2. The CE device may be, for example, the CE 1 shown in FIG. 2, the first PE device may be, for example, the PE 1-1 shown in FIG. 2, and the second PE device may be, for example, the PE 1-2 shown in FIG. 2. The method 300 includes S301 to S305.

S301. The first PE device generates a first message.

The first message carries a first MAC/IP advertisement route and a first VLAN identifier. The first MAC/IP advertisement route includes a MAC address and an ESI used to identify an ES. The MAC address included in the first MAC/IP advertisement route is a MAC address of the CE device or a MAC address of a terminal device managed by the CE device. The first VLAN identifier is used to identify a VLAN to which the MAC address included in the first MAC/IP advertisement route belongs. The first message further includes a next hop network address, and the next hop network address is a network address of the first PE device, for example, a loopback address of the first PE device. It should be noted that the loopback address in this application is an IP address configured on a loopback interface of a network device (such as a router or a switch), and is usually used as a network device identifier (for example, an IP version 4 (IPv4) address with a 32-bit mask: 10.10.1.1/32). This can be understood by a person skilled in the art.

In an implementation, the first PE device receives, through the first interface, a packet sent by the CE device over the first link, and the packet carries the MAC address of the CE device or a MAC address of a terminal device accessing the CE device, and the first VLAN identifier. The first PE device obtains the MAC address included in the first MAC/IP advertisement route and the first VLAN identifier from the packet. The first PE device determines the ESI based on the first interface. The first PE device may include a plurality of interfaces. The plurality of interfaces may be a plurality of Ethernet interfaces. The first PE device may store configuration information of each interface of the first PE device. Configuration information of the first interface includes the ESI. In other words, the first interface corresponds to the ESI. The first PE device may determine the ESI based on the correspondence between the first interface and the ESI.

S302. The first PE device sends the first message to the second PE device.

The first PE device sends the first message to the second PE device. The first MAC/IP advertisement route and the first VLAN identifier are used by the second PE device to generate a first MAC forwarding entry. The first MAC forwarding entry includes the MAC address included in the first MAC/IP advertisement route and the first VLAN identifier, an outbound interface identifier included in the first MAC forwarding entry is an identifier of the second interface, and the first MAC forwarding entry is used by the second PE device to forward, to the CE device, a packet whose destination MAC address is the MAC address included in the first MAC/IP advertisement route.

It should be noted that, in this application, the first PE device can learn the MAC address included in the first MAC/IP advertisement route from the CE device, and the second PE device cannot learn the MAC address included in the first MAC/IP advertisement route from the CE device.

Figure 4A:
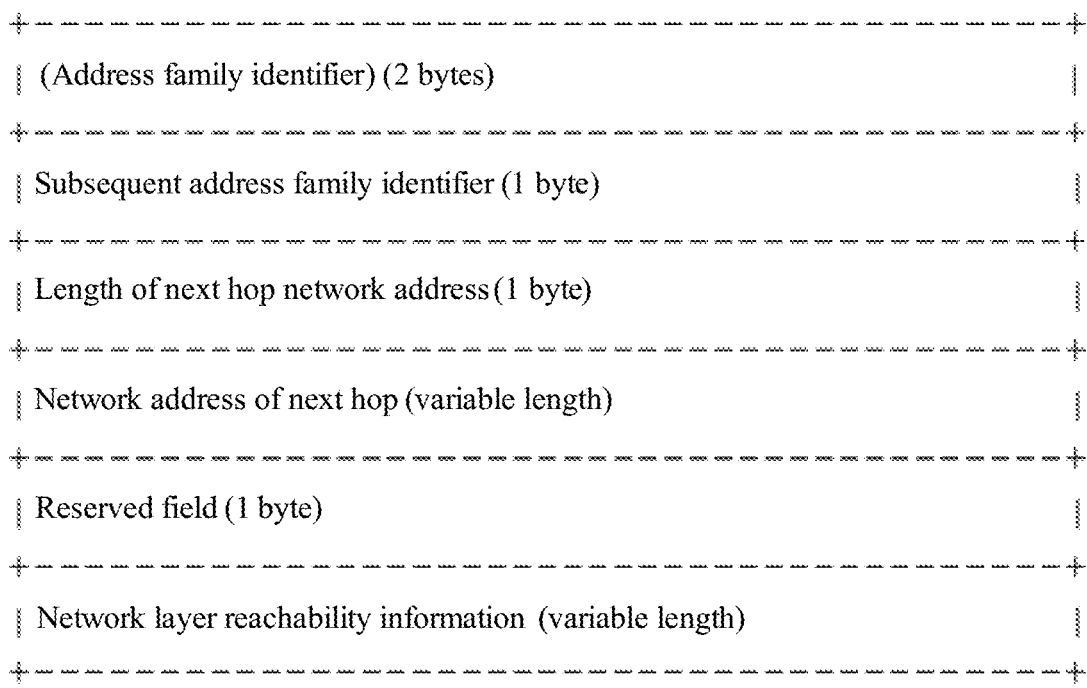
FIG. 4A is a schematic diagram of a format of an MP_REACH_NLRI attribute field in a BGP update message according to an embodiment of this application.
Figure 4B:
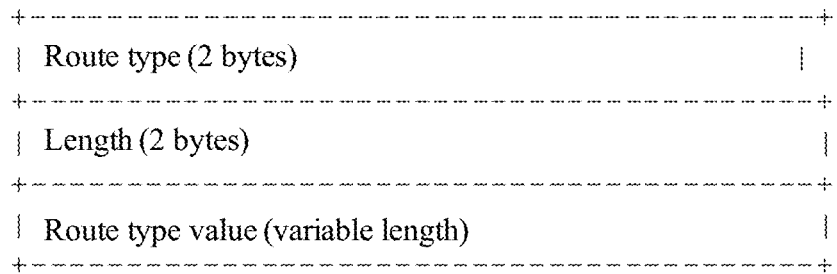
FIG. 4B is a schematic diagram of an EVPN NLRI field format according to an embodiment of this application.

In an implementation, the first message is a Border Gateway Protocol (BGP) update message (which may also be referred to as a BGP update packet). In this application, the BGP update message is referred to as a first BGP update message. The first BGP update message carries the MAC/IP advertisement route and the first VLAN identifier. For convenience, the MAC/IP advertisement route carried in the first BGP update message is referred to as the first MAC/IP advertisement route. The MAC/IP advertisement route belongs to a route type in EVPN network layer reachability information (NLRI) defined in the BGP protocol, and is used to instruct to forward unicast traffic. The EVPN NLRI is carried in a multiprotocol reachable network layer reachability information (MP_REACH_NLRI) attribute. The MP_REACH_NLRI attribute is an attribute defined in the BGP update message, and an example format is shown in FIG. 4A. The attribute includes an address family identifier (AFI) field and a subsequent address family identifier (SAFI) field. A value of the AFI field is used to indicate an L2VPN. For example, the value of the AFI field is 25. A value of the SAFI field is used to indicate the EVPN. For example, the value of the SAFI field is 70. The MP_REACH_NLRI attribute further includes a length of a next hop network address and a network address of next hop field. The network address of next hop field is used to carry the next hop network address (such as a loopback address). The MP_REACH_NLRI attribute further includes an NLRI field. With reference to the EVPN in the L2VPN indicated by values of the AFI and the SAFI, the NLRI field is an EVPN NLRI field. As shown in FIG. 4B, the EVPN NLRI field includes, for example, a route type field of 2 bytes, a length field of 2 bytes, and a route type specific field of a variable length.

Figure 4C:
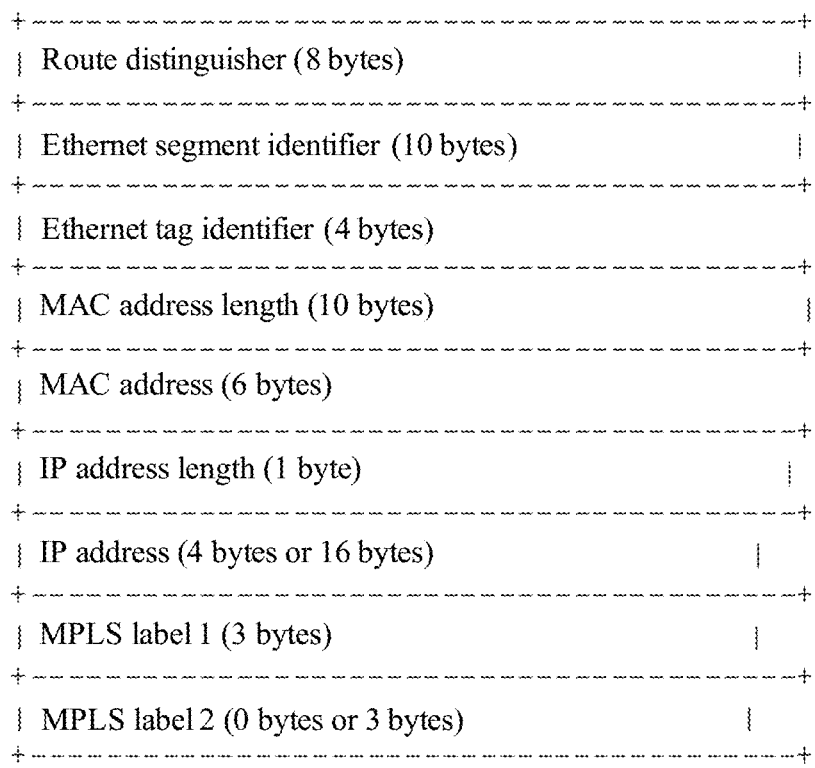
FIG. 4C is a schematic diagram of an EVPN MAC/IP advertisement route field format according to an embodiment of this application.
Figure 4D:
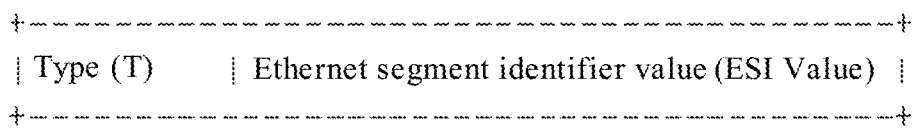
FIG. 4D is a schematic diagram of an ESI field format according to an embodiment of this application.

It should be noted that this application imposes no specific limitation on lengths of the route type field and the length field. The route type includes the MAC/IP advertisement route. For example, a value of the route type is 2. The route type specific field is used to carry details of the MAC/IP advertisement route. As shown in FIG. 4C, the MAC/IP advertisement route includes a route distinguisher RD) field of 8 bytes, an Ethernet segment identifier (ESI) field of 10 bytes, an Ethernet tag identifier (Ethernet Tag ID) field of 4 bytes, a MAC address length field of 1 byte, a MAC address field of 6 bytes, a length of next hop network address field of 1 byte, a network address of next hop field of 0 bytes or 4 bytes or 16 bytes, an MPLS label 1 field of 3 bytes, and an MPLS label 2 field of 0 bytes or 3 bytes. The MPLS label 2 is used to instruct to forward layer 3 traffic. A format of the ESI field in FIG. 4C is shown in FIG. 4D, and includes a type (T) field and an ESI value field. The type field is used to indicate an ESI generation manner. Two common generation manners are Type 0 and Type 1, Type 0 indicates generation through manual configuration, and Type 1 indicates running the Link Aggregation Control Protocol (LACP) between a PE and a CE. A value of the ESI value field ranges from 0 to 0xFF, where "0x" indicates hexadecimal. For generation and configuration of the ES and the ESI, refer to descriptions in Chapter 5 in the RFC 7432. For definitions of the BGP update message and the MP_REACH_NLRI attribute, refer to descriptions in the RFC 476. For a definition of the EVPN NLRI field, refer to descriptions in the RFC 7432.

Figure 5:
FIG. 5 is a schematic diagram of a format of a VLAN attribute field in a BGP update message according to an embodiment of this application.

For example, in this application, a VLAN attribute is added by extending the BGP protocol, and the VLAN attribute carries the VLAN identifier. An example format of the VLAN attribute is shown in FIG. 5. The VLAN attribute includes a type field and a sub-type field. A value of the type field is used to identify a type of a multiplex EVPN extended community attribute, and a value is, for example, OX06. A value of the sub-type field indicates that the extended community attribute is a VLAN extended community attribute, and a value is, for example, 0xcc. Values of the type field and the sub-type field are only examples. An actual value is allocated by Internet Assigned Numbers Authority (IANA). The VLAN attribute further includes a reserved field. When the reserved field is not used, the VLAN attribute is filled with 0. The VLAN attribute further includes a VLAN value field. A length of the VLAN value field may be, for example, four bytes, and the VLAN value field is used to carry a VLAN identifier. In an implementation, the VLAN value field includes a service VLAN (S-VLAN) field and a customer VLAN (C-VLAN) field. The S-VLAN field is used to carry an S-VLAN identifier and cannot be 0. The C-VLAN field is used to carry the C-VLAN identifier. When the value of the field is 0, it indicates that no C-VLAN exists. Alternatively, when the value of the field is not 0, it indicates that the C-VLAN identifier exists. A length of each of the type field and the sub-type field may be, for example, one byte; a length of the reserved field may be, for example, two bytes; and a length of each of the S-VLAN field and the C-VLAN field may be, for example, two bytes. This application imposes no specific limitation thereto.

S303. The second PE device receives the first message sent by the first PE device.

S304. The second PE device determines that an interface connected to the CE device is the second interface.

In an implementation, in the EVPN, when a plurality of PE devices are connected to a same CE device, interfaces configured to connect the CE device are provided with a same ESI. The CE device is multihomed to the first PE device and the second PE device through E-TRUNK. It is equivalent to that the CE device is connected to one PE device. The first PE device and the second PE device each include a plurality of interfaces. The first PE device is connected to the CE device through the first interface, and the second PE device is connected to the CE device through the second interface. The first PE device stores the configuration information of the first interface. The second PE device stores configuration information of the second interface. The configuration information of the first interface includes the ESI. The configuration information of the second interface includes the ESI. The ESI configured for the first interface is the same as the ESI configured for the second interface. Therefore, after receiving the first message, the second PE device obtains the first MAC/IP advertisement route carried in the first message. The second PE device extracts the ESI carried in the first MAC/IP advertisement route, to obtain the ESI. The second PE device determines, based on the ESI, that the interface connected to the CE device is the second interface. The second PE device may include a plurality of interfaces. The plurality of interfaces may be a plurality of Ethernet interfaces. The second PE device may store configuration information of each interface of the second PE device. The configuration information of the second interface includes the ESI. In other words, the second interface corresponds to the ESI. The second PE device may use the ESI carried in the first MAC/IP advertisement route as a search keyword, to search configuration information of the plurality of interfaces stored in the second PE device for configuration information including the ESI. When the second PE device finds the configuration information including the ESI, the second PE device may determine, based on the correspondence between the second interface and the ESI, that the second PE device is connected to the CE device through the second interface.

S305. The second PE device generates a first MAC forwarding entry.

The second PE device generates the first MAC forwarding entry based on the determined second interface, the MAC address included in the first MAC/IP advertisement route, and the first VLAN identifier. The first MAC forwarding entry is used by the second PE device to forward, to the CE device, a packet whose destination MAC address is the MAC address included in the first MAC/IP advertisement route. The first MAC forwarding entry includes the MAC address included in the first MAC/IP advertisement route and the first VLAN identifier, and the outbound interface identifier included in the first MAC forwarding entry is the identifier of the second interface. For example, after receiving a data stream (known unicast data stream) bound for the terminal device, the second PE device forwards a packet in the data stream to the CE device through the determined second interface based on the first MAC forwarding entry.

In an implementation, the CE device accesses the first PE device and the second PE device in a manner of an Ethernet tag, Ethernet tag termination, 802.1Q in 802.1Q (QinQ), or the like. The second PE device receives a first packet that carries a second VLAN identifier, and a destination MAC address of the first packet is the MAC address included in the first MAC/IP advertisement route. The second PE device determines, by searching the first MAC forwarding entry, that the second interface is an outbound interface for forwarding the first packet. The second PE device uses a MAC address carried in the first packet as a keyword to search the first MAC forwarding entry for the first VLAN identifier associated with the MAC address; replaces the second VLAN identifier in the first packet with the first VLAN identifier; obtains, after completing all forwarding processing actions, a second packet including the encapsulated first VLAN identifier; and forwards the second packet to the CE device through the second interface. It should be noted that, in the embodiments of this application, according to different access manners in which the CE device accesses the PE device, the first VLAN identifier may include only a single VLAN identifier (ID), or may include a plurality of VLAN IDs. Likewise, the second VLAN identifier may include only a single VLAN ID, or may include a plurality of VLAN IDs. This application imposes no specific limitation on specific forms of the first VLAN identifier and the second VLAN identifier.

In the foregoing technical solution, when the second PE device does not learn a MAC route from the CE device and cannot obtain valid VLAN information, the first PE device notifies the second PE device of the MAC route learned from the CE device and the VLAN identifier. The second PE device can generate the first MAC forwarding entry based on the received MAC route and VLAN identifier. When receiving a data stream whose destination MAC address is the MAC address included in the first MAC/IP advertisement route, the second PE device may directly forward the data stream to the CE device over the second link based on the first MAC forwarding entry. In the foregoing technical solution, when a CE device is multihomed to a plurality of PE devices in a multi-active manner, the plurality of PE devices can effectively share load, thereby properly utilizing bandwidth resources. Further, in the EVPN, a PE device may learn the VLAN identifier using a control plane. In some possible scenarios, the second PE device cannot directly learn the VLAN identifier from the CE device. According to the foregoing technical solution provided in this application, the second PE device may learn the VLAN identifier from the first PE device. Further, the second PE device may forward traffic to the CE device based on the VLAN identifier. For example, when the CE device accesses the second PE device using an Ethernet tag or through Ethernet tag termination, the traffic is forwarded to the CE device based on the VLAN identifier.

Figure 6:
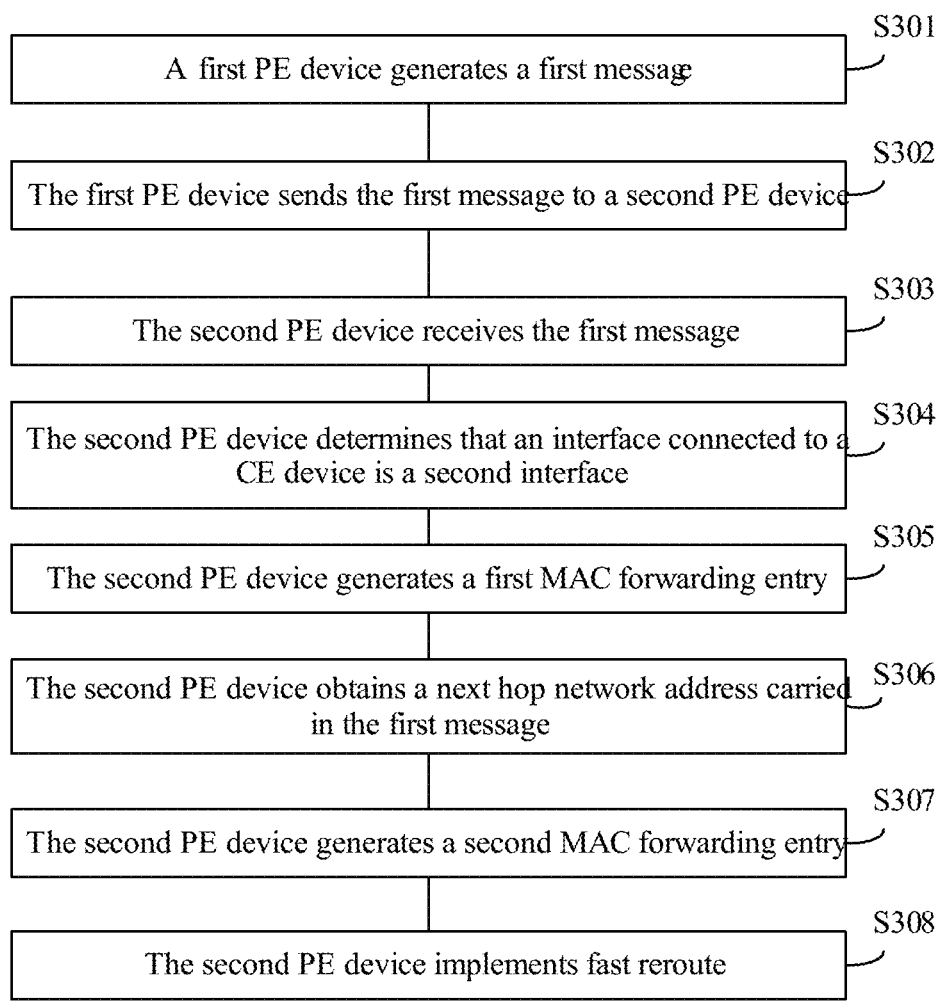
FIG. 6 is a schematic flowchart of another packet processing method according to an embodiment of this application.

In an implementation, after S305, the method 300 may further include S306 to S308. As shown in FIG. 6, the method 300 includes S301 to S308.

For related descriptions of S301 to S305, refer to the foregoing embodiment. Details are not described herein again.

S306. The second PE device obtains a next hop network address carried in the first message.

The next hop network address may be referred to as a first next hop network address, and the first next hop network address is the network address of the first PE device, for example, the loopback address of the first PE device.

S307. The second PE device generates a second MAC forwarding entry.

The second PE device generates the second MAC forwarding entry based on the MAC address included in the first MAC/IP advertisement route and the network address of the first PE device. The second MAC forwarding entry includes the MAC address included in the first MAC/IP advertisement route, and a next hop network address included in the second MAC forwarding entry is the network address of the first PE device.

In an implementation, the second PE device receives, through a third interface Intf1, the first message sent by the first PE device, and the second PE device uses the first PE device as a next hop node bound for the terminal device. A control plane (for example, a control board) of the second PE device generates a MAC routing entry (as shown in Table 1), a destination MAC address of the MAC routing entry is the MAC address included in the first MAC/IP advertisement route, and a next hop network address is the loopback address of the first PE device. Then the second PE device generates the second MAC forwarding entry (as shown in Table 2) based on the MAC routing entry, and sends the second MAC forwarding entry to a forwarding plane (for example, a forwarding board) of the second PE device. When the second PE device generates the second MAC forwarding entry based on the MAC routing entry, the second PE device may determine a destination MAC address and an outbound interface in the second MAC forwarding entry based on the MAC routing entry. The destination MAC address of the MAC forwarding entry is a destination address in the MAC routing entry (namely, a MAC address of UE 1). The outbound interface of the MAC forwarding entry is Intf1. That the second PE device determines Intf1 as the outbound interface in the second MAC forwarding entry may include the following steps: First, the second PE device uses the loopback address of the first PE device in the MAC routing entry as a search keyword, to search a mapping table (an FEC to Next-Hop Label Forwarding Entry (NHLFE) (FTN) mapping table or an FTN forwarding table for short) between a forwarding equivalence class (FEC) and a next hop label forwarding entry to learn that an outbound interface corresponding to the loopback address of the first PE device is a Tunnel ID of a tunnel from the second PE device to the first PE device; and then uses the tunnel ID to search a tunnel forwarding table, to learn that an outbound interface corresponding to the tunnel ID is Intf1 (to be more specific, an interface, on the second PE device, of the tunnel from the second PE device to the first PE device). The second PE device determines Intf1 as the outbound interface in the second MAC forwarding entry. It should be noted that the tunnel may be a label switched path (LSP) tunnel, or may be a Resource Reservation Protocol-traffic engineering (RSVP-TE) tunnel, or the like. The tunnel is used to carry a known unicast data stream, and is not shown in FIG. 2 in this embodiment of the present disclosure for brevity. This can be understood by a person skilled in the art.

TABLE 1

| MAC routing table | |
| --- | --- |
| Destination MAC | Next hop network address list |
| MAC address of a terminal device | Loopback address of the first PE device |

TABLE 2

| MAC forwarding table | |
| --- | --- |
| Destination MAC | Outbound interface list |
| MAC address of a terminal device | Intf1 |

S308. The second PE device implements Fast Reroute (FRR) based on the first MAC forwarding entry and the second MAC forwarding entry. The first MAC forwarding entry is used as a primary forwarding entry, and the second MAC forwarding entry is used as a secondary forwarding entry.

When the second PE device receives known unicast traffic (a data packet whose destination MAC address is the MAC address included in the first MAC/IP advertisement route), the second PE device queries a MAC forwarding table; and directly forwards, according to an instruction of the first MAC forwarding entry when the second link is in a normal working state, the packet to the terminal device over the second link using the CE device. When the second link is faulty and the second PE device receives the known unicast traffic, the second PE device forwards the traffic to the first PE device according to the instruction of the second MAC forwarding entry, and the first PE device forwards the traffic to the CE device, thereby increasing a failure convergence speed.

Figure 7:
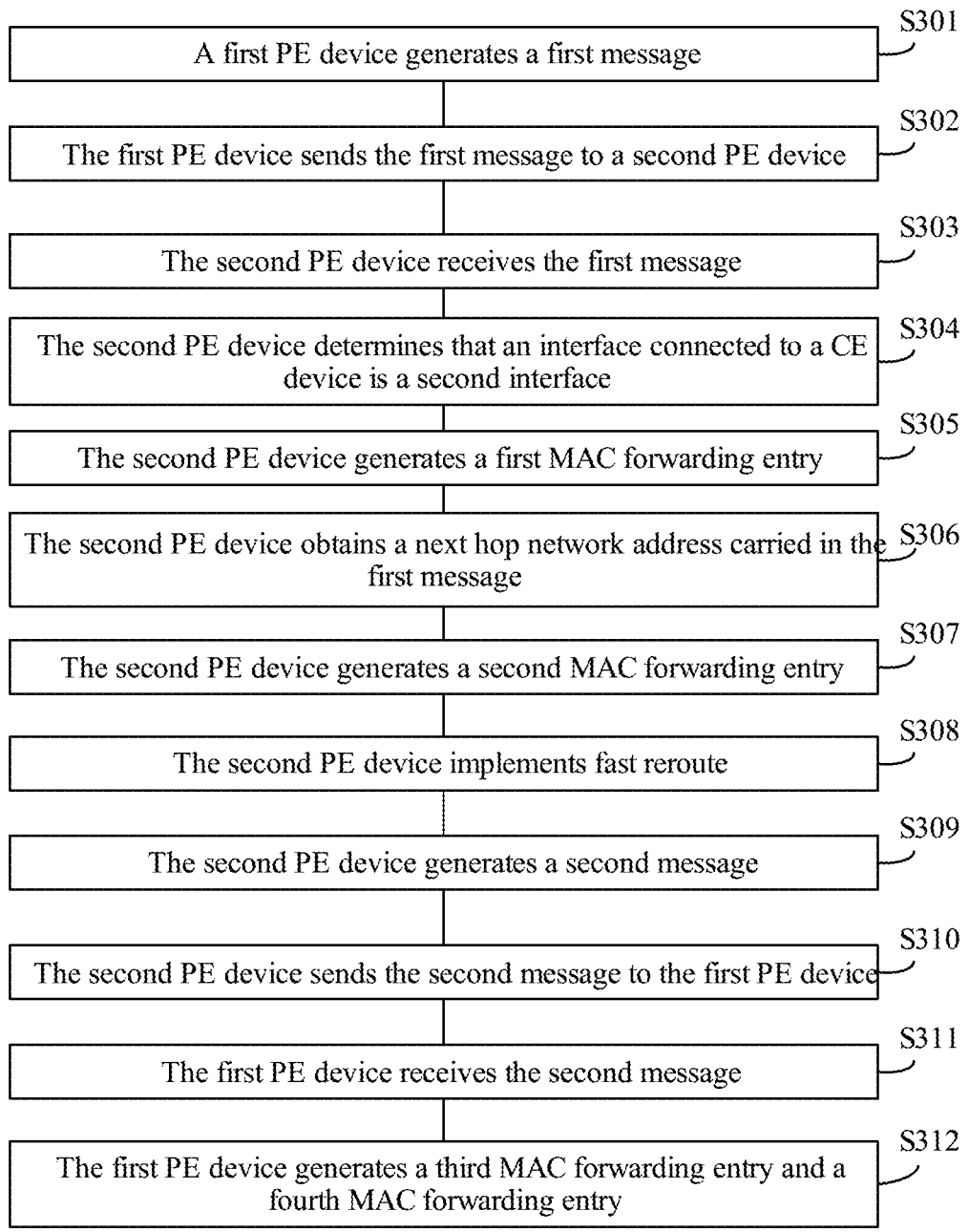
FIG. 7 is a schematic flowchart of another packet processing method according to an embodiment of this application.

Optionally, after S305, the method 300 may further include S309 to S312. The following describes the method 300 with reference to FIG. 7.

For related descriptions of S301 to S305, refer to the foregoing embodiment. Details are not described herein again.

S309. The second PE device generates a second message.

In an implementation, after receiving the first message sent by the first PE device, the second PE device generates the second message. The second PE device generates the second message based on the first message. The second message is used to carry a second MAC/IP advertisement route, a next hop network address, and the first VLAN identifier. The second MAC/IP advertisement route includes a MAC address and the ESI. The MAC address included in the second MAC/IP advertisement route is the same as the MAC address included in the first MAC/IP advertisement route. The second PE device obtains the MAC address included in the first MAC/IP advertisement route carried in the first message, and encapsulates the MAC address into the second MAC/IP advertisement route carried in the second message. The next hop network address carried in the second message is a network address of the second PE device, for example, a loopback address of the second PE device.

S310. The second PE device sends the second message to the first PE device.

In an implementation, the second message is a BGP update message. In this application, the BGP update message is referred to as a second BGP update message. The second BGP update message carries the second MAC/IP advertisement route. The second BGP update message includes a VLAN attribute field used to carry the first VLAN identifier. For related descriptions of a specific format of the second BGP update message, a specific format of the second MAC/IP advertisement route, and a specific format of the VLAN attribute that carries the first VLAN identifier, refer to descriptions of the specific format of the first BGP update message, the specific format of the first MAC/IP advertisement route, and the VLAN attribute that carries the first VLAN identifier in S202. Details are not described herein again.

In an implementation, the second message further carries instruction information, and the instruction information is used to instruct the first PE device not to send, to the second PE device after the first PE device receives the second message, the first VLAN identifier and a MAC/IP advertisement route that arrives at the MAC address included in the second MAC/IP advertisement route, in order to avoid a packet loop. The second message includes a flag (Flag) field, used to carry the instruction information. Optionally, a flag (Flag) field is set in the VLAN attribute field to carry the instruction information. A length of the flag field may be, for example, one bit or one byte. This application imposes no limitation thereto. Optionally, a new field may be defined in the second message, for example, a flag field used to carry the instruction information. This application imposes no specific limitation thereto.

S311. The first PE device receives the second message sent by the second PE device.

S312. The first PE device generates a third MAC forwarding entry and a fourth MAC forwarding entry.

In an implementation, the second message carries the first VLAN identifier. After receiving the second message, the first PE device generates the third MAC forwarding entry based on the first VLAN identifier carried in the second message, and based on the MAC address and the ESI that are included in the second MAC/IP advertisement route carried in the second message. The third MAC forwarding entry is used by the first PE device to forward a packet whose destination MAC address is the MAC address included in the second MAC/IP advertisement route, and an outbound interface identifier included in the third MAC forwarding entry is an identifier of the first interface. A manner in which the first PE device generates the third MAC forwarding entry is similar to the manner in which the second PE device generates the first MAC forwarding entry in S305. For more specific descriptions, refer to S305. Details are not described herein again.

It should be noted that, after receiving the second message, the first PE device may generate the third MAC forwarding entry in the following scenarios.

Scenario 1: A local MAC route that arrives at the terminal device does not exist on the first PE device. For example, when a link between the first PE device and the CE device is faulty, the local MAC route learned by the first PE device from the CE device is cancelled. In this case, the first PE device may generate the third MAC forwarding entry based on the MAC address and the ESI that are included in the second MAC/IP advertisement route carried by the first PE device.

Scenario 2: When the first PE device receives the second message, and a local MAC route that arrives at the MAC address included in the second MAC/IP advertisement route exists on the first PE device, the first PE device stores routing information carried in the second message. When the local MAC route stored by the first PE device is cancelled because a link between the first PE device and the CE device is faulty, the first PE device generates the third MAC forwarding entry based on the routing information carried in the second message, in other words, based on the MAC address and the ESI that are included in the second MAC/IP advertisement route.

The foregoing two scenarios are merely examples. This application imposes no limitation thereto.

The first PE device generates the fourth MAC forwarding entry based on the destination MAC address and the network address of the second PE device. The fourth MAC forwarding entry is a secondary forwarding entry used to forward a packet whose destination MAC address is the MAC address included in the second MAC/IP advertisement route, and a next hop network address included in the fourth MAC forwarding entry is the network address of the second PE device. A manner in which the first PE device generates the fourth MAC forwarding entry is similar to the manner in which the second PE device generates the second MAC forwarding entry in S307. For more specific descriptions, refer to S307. Details are not described herein again.

In an implementation, after generating the fourth MAC forwarding entry, the first PE device implements fast reroute FRR based on a local MAC forwarding entry of the first PE device that arrives at the CE device (for example, the third MAC forwarding entry, or a stored local MAC forwarding entry before the third MAC forwarding entry is generated) and the fourth MAC forwarding entry.

Therefore, according to the foregoing method, when the first PE device receives known unicast traffic (a data packet whose destination MAC address is the MAC address included in the second MAC/IP advertisement route), the first PE device queries a MAC forwarding table; and when the first link normally works, directly forwards the packet according to an instruction of a local MAC forwarding entry (which may also be referred to as a fifth MAC forwarding entry, where the fifth MAC forwarding entry may be, for example, the third MAC forwarding entry, or a stored local MAC forwarding entry before the third MAC forwarding entry is generated) using the CE device. When the first link is faulty, after the first PE device receives the known unicast traffic, the first PE device queries the MAC forwarding table, and forwards the traffic to the second PE device according to an instruction of a secondary forwarding entry, in other words, according to an instruction of the fourth MAC forwarding entry; and the second PE device forwards the traffic to the CE device, thereby increasing a failure convergence speed.

It should be noted that the method 300 in this application may include S306 to S308 and S309 to S312, and there is no execution sequence of S306 to S308 and S309 to S312.

In this embodiment of this application, after the link from the first PE device to the CE device is faulty, a MAC route in which the first PE device arrives at the CE device is unreachable. In this case, the first PE device sends a MAC route cancel message to the second PE device, in order to cancel the first MAC/IP advertisement route. After receiving the MAC route cancel message sent by the first PE device, the second PE device does not immediately delete the first MAC/IP advertisement route, and instead, the second PE device starts an aging timer. The first MAC/IP advertisement route is deleted if no updated MAC route that arrives at the CE device is received after the aging timer expires. Therefore, the following case may be avoided: After receiving the MAC route cancel message sent by the first PE device, the second PE device sends a MAC route cancel message to a remote PE device, for example, a third PE device PE 2 shown in FIG. 2. Consequently, a local MAC route on the first PE device is cancelled due to an interface fault. After the second PE device notifies that a remote MAC route is cancelled, no MAC route that arrives at the CE device exists on the first PE device. In this case, if traffic sent by the PE 2 arrives at the first PE device, the first PE device cannot forward the traffic because the first PE device cannot find the MAC forwarding table.

With reference to FIG. 2 to FIG. 7, the foregoing describes the packet processing method in detail according to the embodiments of this application. With reference to FIG. 8 to FIG. 15, the following describes in detail a provider edge PE device and a system that are used for packet processing according to embodiments of this application.

Figure 8:
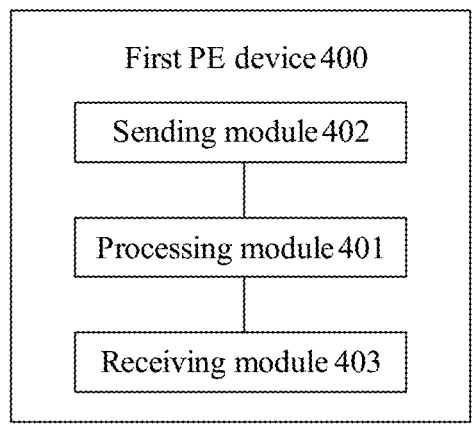
FIG. 8 is a schematic structural diagram of a first PE device according to an embodiment of this application.

FIG. 8 is a schematic diagram of a first PE device 400 according to an embodiment of this application. The first PE device 400 may be the PE 1-1 in FIG. 2 and be configured to perform the method shown in FIG. 3, FIG. 6, or FIG. 7. A customer edge CE device is connected to a first interface of the first PE device over a first link, and the CE device is connected to a second interface of a second PE device over a second link. As shown in FIG. 8, the first PE device 400 includes a processing module 401 and a sending module 402.

The processing module 401 is configured to generate a first message, where the first message carries a first MAC/IP advertisement route and a virtual local area network (VLAN) identifier, the first MAC/IP advertisement route includes a MAC address and an ESI used to identify an ES, the MAC address included in the first MAC/IP advertisement route is a MAC address of the CE device or a MAC address of a terminal device managed by the CE device, the ES includes the first link and the second link, and the VLAN identifier is used to indicate a VLAN to which the MAC address included in the first MAC/IP advertisement route belongs.

The sending module 402 is configured to send the first message to the second PE device, where the first MAC/IP advertisement route and the VLAN identifier are used by the second PE device to generate a first MAC forwarding entry, the first MAC forwarding entry includes the MAC address included in the first MAC/IP advertisement route and the VLAN identifier, an outbound interface identifier included in the first MAC forwarding entry is an identifier of the second interface, and the first MAC forwarding entry is used by the second PE device to forward, to the CE device, a packet whose destination MAC address is the MAC address included in the first MAC/IP advertisement route.

In the foregoing technical solution, when the second PE device does not learn a MAC route from the CE device and cannot obtain valid VLAN information, the first PE device notifies the second PE device of the MAC route learned from the CE device and the VLAN identifier. The second PE device can generate the first MAC forwarding entry based on the received MAC route and VLAN identifier. When receiving a data stream whose destination MAC address is the MAC address included in the first MAC/IP advertisement route, the second PE device may directly forward the data stream to the CE device over the second link based on the first MAC forwarding entry. The CE device forwards the data stream to the terminal device. In the foregoing technical solution, when a CE device is multihomed to a plurality of PE devices in a multi-active manner, the plurality of PE devices can effectively share load, thereby properly utilizing bandwidth resources. Further, in the EVPN, a PE device may learn the VLAN identifier using a control plane. In some possible scenarios, the second PE device cannot directly learn the VLAN identifier from the CE device. According to the foregoing technical solution provided in this application, the second PE device may learn the VLAN identifier from the first PE device. Further, the second PE device may forward traffic to the CE device based on the VLAN identifier. For example, when the CE device accesses the second PE device using an Ethernet tag (tag) or through Ethernet tag termination, the second PE can forward the traffic to the CE device based on the VLAN identifier.

In an implementation, the first message is a first Border Gateway Protocol update BGP update message, and the first BGP update message includes a VLAN attribute field used to carry the VLAN identifier. For a format of the first BGP update message and a format of the VLAN attribute field (for example, fields or extension fields to be used), refer to descriptions of corresponding parts in the foregoing method embodiments. Details are not described herein again.

In this application, the VLAN attribute is extended in a BGP update message, thereby effectively implementing VLAN information advertisement using an existing protocol.

In an implementation, the first PE device 400 further includes a receiving module 403. After the sending module sends the first message to the second PE device, the receiving module 403 is configured to receive a second message sent by the second PE device. The second message carries a second MAC/IP advertisement route, a next hop network address, and the VLAN identifier. The second MAC/IP advertisement route includes a destination MAC address and the ESI. The destination MAC address in the second MAC/IP advertisement route is the same as the MAC address included in the first MAC/IP advertisement route. The next hop network address carried in the second message is a network address of the second PE device. The ESI is used by the first PE device to determine that the first PE device is connected to the CE device through the first interface. The determined first interface, the MAC address included in the second MAC/IP advertisement route, and the VLAN identifier are used by the first PE device to generate a second MAC forwarding entry, the second MAC forwarding entry includes the MAC address included in the second MAC/IP advertisement route, an outbound interface identifier included in the second forwarding entry is an identifier of the first interface, and the second MAC forwarding entry is used by the first PE device to forward an entry of a packet whose destination MAC address is the MAC address included in the second MAC/IP advertisement route.

The processing module 401 is further configured to generate a third MAC forwarding entry based on the MAC address included in the second MAC/IP advertisement route and the network address of the second PE device. The third MAC forwarding entry includes the MAC address included in the second MAC/IP advertisement route, a next hop network address included in the third MAC forwarding entry is the network address of the second PE device, and when the first link is faulty, the third MAC forwarding entry is used by the first PE device to forward an entry of a packet whose destination MAC address is the MAC address included in the second MAC/IP advertisement route.

After generating the third MAC forwarding entry and the fourth MAC forwarding entry, the first PE device implements fast reroute FRR based on the third MAC forwarding entry and the fourth MAC forwarding entry. When the first PE device receives known unicast traffic (a data packet whose destination MAC address is the MAC address included in the second MAC/IP advertisement route), the first PE device queries a MAC forwarding table; and when the first link normally works, directly forwards the packet to the terminal device using the CE device according to an instruction of the third MAC forwarding entry. When the first link is faulty, after the first PE device receives the known unicast traffic, the first PE device queries the MAC forwarding table, and forwards the traffic to the second PE device according to an instruction of a secondary forwarding entry, in other words, according to an instruction of the fourth MAC forwarding entry; and the second PE device forwards the traffic to the CE device, thereby increasing a failure convergence speed.

In an implementation, the second message further carries instruction information. The processing module 401 is further configured such that after the receiving module receives the second message sent by the second PE device, the processing module 401 skips sending, to the second PE device according to the instruction information, the VLAN identifier and a MAC/IP advertisement route that arrives at the MAC address included in the second MAC/IP advertisement route. Therefore, a packet loop is avoided.

Figure 9:
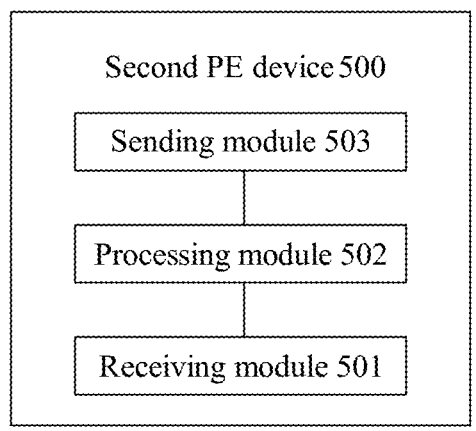
FIG. 9 is a schematic structural diagram of a second PE device according to an embodiment of this application.

FIG. 9 is a schematic diagram of a second PE device 500 according to an embodiment of this application. The second PE device 500 may be the PE 1-2 in FIG. 2 and be configured to perform the method shown in FIG. 3, FIG. 6, or FIG. 7. A customer edge CE device is connected to a first interface of the first PE device over a first link, and the CE device is connected to a second interface of the second PE device over a second link. As shown in FIG. 9, the second PE device 500 includes a receiving module 501 and a processing module 502.

The receiving module 501 is configured to receive a first message sent by the first PE device, where the first message carries a first MAC/IP advertisement route and a first VLAN identifier, the first MAC/IP advertisement route includes a MAC address and an ESI used to identify an ES, the MAC address included in the first MAC/IP advertisement route is a MAC address of the CE device or a MAC address of a terminal device managed by the CE device, the ES includes the first link and the second link, and the first VLAN identifier is used to indicate a VLAN to which the MAC address included in the first MAC/IP advertisement route belongs.

The processing module 502 is configured to determine, based on the ESI carried in the first message received by the receiving module 501, that the second PE device is connected to the CE device through the second interface.

The processing module 502 is further configured to generate a first MAC forwarding entry based on the determined second interface, the MAC address included in the first MAC/IP advertisement route, and the first VLAN identifier, where the first MAC forwarding entry includes the MAC address included in the first MAC/IP advertisement route and the first VLAN identifier, an outbound interface identifier included in the first MAC forwarding entry is an identifier of the second interface, and the first MAC forwarding entry is used by the second PE device to forward, to the CE device, a packet that carries the first VLAN identifier and whose destination MAC address is the MAC address included in the first MAC/IP advertisement route.

In the foregoing technical solution, when the second PE device does not learn a MAC route from the CE device and cannot obtain information about a VLAN to which the terminal device belongs, the first PE device notifies the second PE device of a MAC route that arrives at the terminal device and an identifier of the VLAN to which the terminal device belongs. The second PE device can generate the first MAC forwarding entry based on the received MAC route and VLAN identifier. When receiving a data stream whose destination MAC address is the MAC address included in the first MAC/IP advertisement route, the second PE device may directly forward the data stream to the CE device over the second link based on the first MAC forwarding entry. The CE device forwards the data stream to the terminal device. In the foregoing technical solution, when a CE device is multihomed to a plurality of PE devices in a multi-active manner, the plurality of PE devices can effectively share load, thereby properly utilizing bandwidth resources. Further, in the EVPN, a PE device may learn, using a control plane, the VLAN information of the VLAN to which the terminal device belongs. In some possible scenarios, the second PE device cannot directly learn the VLAN information of the terminal device from the CE device. According to the foregoing technical solution provided in this application, the second PE device may learn the VLAN information of the terminal device from the first PE device. Further, the second PE device may forward, to the CE device based on the VLAN information of the terminal device, traffic that arrives at the terminal device. For example, when the CE device accesses the second PE device using an Ethernet tag or through Ethernet tag termination, the second PE device cannot directly learn the VLAN information of the terminal device from the CE device.

In an implementation, the first message further carries a next hop network address, and the next hop network address in the first message is a network address of the first PE device, for example, a loopback address of the first PE device. The processing module 502 is further configured to obtain the network address of the first PE device based on the first message. The processing module 502 is further configured to generate a second MAC forwarding entry based on the MAC address included in the first MAC/IP advertisement route and the network address of the first PE device. The second MAC forwarding entry includes the MAC address included in the first MAC/IP advertisement route, and a next hop network address included in the second MAC forwarding entry is the network address of the first PE device. When the second link is faulty, the second MAC forwarding entry is used by the second PE to forward the packet that carries the first VLAN identifier and whose destination MAC address is the MAC address included in the first MAC/IP advertisement route.

When the second PE device receives known unicast traffic (a data packet whose destination MAC address is a MAC address of the terminal device) bound for the terminal device, the second PE device queries a MAC forwarding table; and when the second link is in a normal working state, directly forwards the packet to the terminal device over the second link using the CE device according to an instruction of the first MAC forwarding entry. When the second link is faulty and the second PE device receives the known unicast traffic (the data packet whose destination MAC address is the MAC address of the terminal device) bound for the terminal device, the second PE device forwards the traffic to the first PE device according to an instruction of the second MAC forwarding entry; and the first PE device forwards the traffic to the terminal device, thereby increasing a failure convergence speed.

In an implementation, the first message is a first Border Gateway Protocol update BGP update message, and the first BGP update message includes a VLAN attribute field used to carry the first VLAN identifier. For a format of the first BGP update message and a format of the VLAN attribute field (for example, fields or extension fields to be used), refer to descriptions of corresponding parts in the foregoing method embodiments. Details are not described herein again.

In this application, the VLAN attribute is extended in a BGP update message, thereby effectively implementing VLAN information advertisement using an existing protocol.

In an implementation, the second PE device further includes a sending module 503. After the processing module generates the first MAC forwarding entry based on the determined second interface, the MAC address included in the first MAC/IP advertisement route, and the first VLAN identifier, the receiving module 501 is further configured to receive a first packet that carries a second VLAN identifier, where a destination MAC address of the first packet is the MAC address included in the first MAC/IP advertisement route; the processing module 502 is further configured to replace the second VLAN identifier carried in the second packet with the first VLAN identifier based on the first MAC forwarding entry, to obtain a second packet that carries the first VLAN identifier; and the sending module 503 is configured to send the second packet to the CE device.

In an implementation, after the receiving module receives the first message sent by the first PE device, the processing module 502 is further configured to generate a second message. The processing module 502 generates the second message based on the first message received by the receiving module 501. The second message carries a second MAC/IP advertisement route, a next hop network address, and the first VLAN identifier, the second MAC/IP advertisement route includes a MAC address and the ESI, and the MAC address included in the second MAC/IP advertisement route is the same as the MAC address included in the first MAC/IP advertisement route. The processing module 502 obtains the MAC address included in the first MAC/IP advertisement route carried in the first message, and encapsulates the MAC address into the second MAC/IP advertisement route carried in the second message. The next hop network address carried in the second message is a network address of the second PE device.

The sending module 503 is further configured to send the second message to the first PE device, where the second message is used by the first PE device to generate a third MAC forwarding entry and a fourth MAC forwarding entry.

The third MAC forwarding entry is used by the first PE device to forward a packet whose destination MAC address is the MAC address included in the second MAC/IP advertisement route, the third MAC forwarding entry includes the MAC address included in the second MAC/IP advertisement route and the first VLAN identifier, and an outbound interface identifier included in the third MAC forwarding entry is an identifier of the first interface. When the first link is faulty, the fourth MAC forwarding entry is used by the first PE device to forward a packet whose destination MAC address is the MAC address included in the second MAC/IP advertisement route, the fourth MAC forwarding entry includes the MAC address included in the second MAC/IP advertisement route, and a next hop network address included in the fourth MAC forwarding entry is the network address of the second PE device.

According to the foregoing solution, after receiving the first message, the second PE device generates, on the control plane based on information carried in the first message, a local primary MAC routing entry and a local secondary MAC routing entry that is used for fast reroute. Further, the control plane delivers the primary MAC routing entry and the secondary MAC routing entry to a forwarding plane, and generates the first MAC forwarding entry and the second MAC forwarding entry that are used for fast reroute. In addition, after receiving the first message, the second PE device generates the local first MAC forwarding entry, and then returns the local MAC route to the first PE device, such that the first PE device generates a secondary MAC routing entry used to implement fast reroute. The MAC route learned by the first PE device from the CE device may be used as a local MAC route, namely, a primary MAC route. When a link that connects the first PE device and the CE device is faulty, for example, when the first link is faulty, the local MAC route of the first PE device is cancelled. After the first link recovers, the first PE device may generate the local MAC route again based on the second MAC/IP advertisement route and the first VLAN identifier that are notified by the second PE device, in order to instruct to forward traffic to the CE device. Therefore, after the first link is faulty and recovers again, a route can be quickly redirected, and fast failure convergence can be implemented.

In an implementation, the second message further carries instruction information, and the instruction information is used to instruct the first PE device not to send, to the second PE device after the first PE device receives the second message, the first VLAN identifier and a MAC/IP advertisement route that arrives at the MAC address included in the second MAC/IP advertisement route, in order to avoid a packet loop.

Figure 10:
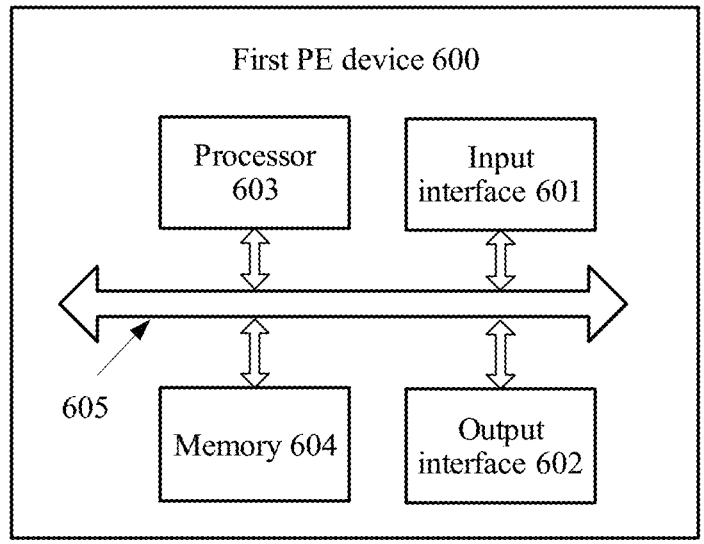
FIG. 10 is a schematic diagram of a hardware structure of a first PE device according to an embodiment of this application.

FIG. 10 is a schematic diagram of a first PE device 600 according to an embodiment of this application. The first PE device 600 may be the PE 1-1 in FIG. 2 and be configured to perform the method shown in FIG. 3, FIG. 6, or FIG. 7. A customer edge CE device is connected to a first interface of the first PE device over a first link, and the CE device is connected to a second interface of a second PE device over a second link. As shown in FIG. 10, the first PE device 600 includes an input interface 601, an output interface 602, a processor 603, and a memory 604. The input interface 601, the output interface 602, the processor 603, and the memory 604 may be connected to each other using a bus system 605.

The memory 604 is configured to store a program. The processor 603 is configured to execute the program in the memory 604, in order to control the input interface 601 to receive a signal, control the output interface 602 to send a signal, and implement steps and functions implemented by the first PE device in the implementation corresponding to FIG. 3, FIG. 6, or FIG. 7. Details are not described herein again. For more specific implementations of the input interface 601, the output interface 602, and the processor 603, refer to descriptions of the receiving module 403, the sending module 402, and the processing module 401 in the implementation in FIG. 8. Details are not described herein again.

Figure 11:
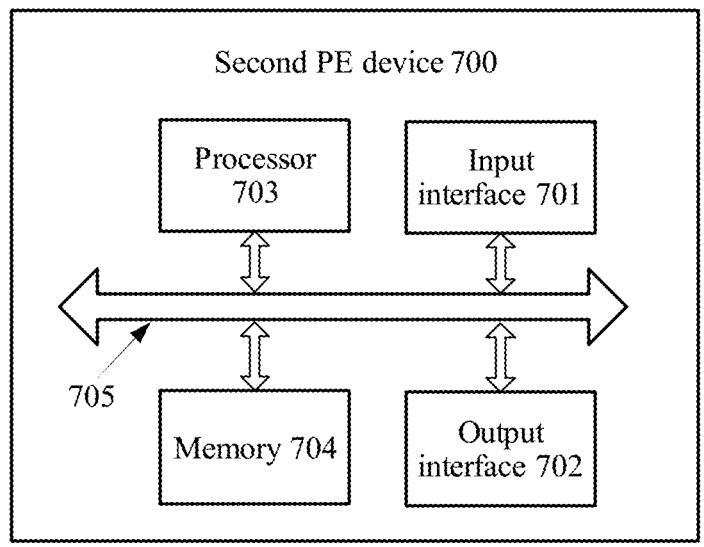
FIG. 11 is a schematic diagram of a hardware structure of a second PE device according to an embodiment of this application.

FIG. 11 is a schematic diagram of a second PE device 700 according to an embodiment of this application. The second PE device 700 may be the PE 1-2 in FIG. 2 and be configured to perform the method shown in FIG. 3, FIG. 6, or FIG. 7. A customer edge CE device is connected to a first interface of the first PE device over a first link, and the CE device is connected to a second interface of the second PE device over a second link. As shown in FIG. 11, the second PE device 700 includes an input interface 701, an output interface 702, a processor 703, and a memory 704. The input interface 701, the output interface 702, the processor 703, and the memory 704 may be connected to each other using a bus system 705.

The memory 704 is configured to store a program. The processor 703 is configured to execute the program in the memory 704, in order to control the input interface 701 to receive a signal, control the output interface 702 to send a signal, and implement steps and functions implemented by the second PE device in the implementation corresponding to FIG. 3, FIG. 6, or FIG. 7. Details are not described herein again. For more specific implementations of the input interface 701, the output interface 702, and the processor 703, refer to descriptions of the receiving module 501, the sending module 503, and the processing module 502 in the implementation in FIG. 9. Details are not described herein again.

It should be understood that, in the embodiments of this application, the processor 703 and the processor 603 each may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

The memory 704 and the memory 604 may include a read-only memory and a random access memory, and respectively provide the processor 703 and the processor 603 with an instruction and data. A part of the memory 704 or the memory 604 may further include a nonvolatile random access memory. For example, the memory 704 or the memory 604 may further store device type information.

In addition to a data bus, the bus system 705 and the bus system 605 each may further include a power bus, a control bus, a status signal bus, and the like. However, for clarity of description, various buses are marked as the bus system in the figure.

In an implementation process, the steps in the method 300 may be respectively performed using an integrated logic circuit of hardware or an instruction in a form of software in the processor 603 and the processor 703. The steps of the packet processing method disclosed with reference to the embodiments of this application may be directly performed by a hardware processor, or may be performed using a combination of hardware in the processor and a software module. A software module may be located in a mature storage medium in the art, such as a random access memory, a flash memory, a read-only memory, a programmable read-only memory, an electrically erasable programmable memory, or a register. The storage medium is separately located in the memory 604 and the memory 704. The processor 603 reads information in the memory 604, and the processor 703 reads information in the memory 704. The steps in the method 300 are completed in combination with the hardware of the processor 603 and the processor 703. To avoid repetition, details are not described herein again.

It should be noted that, in an implementation, the processing module 401 in FIG. 8 may be implemented by the processor 603 in FIG. 10, the sending module 402 may be implemented by the output interface 602 in FIG. 10, and the receiving module 403 may be implemented by the input interface 601 in FIG. 10. Likewise, the processing module 502 in FIG. 9 is implemented by the processor 703 in FIG. 11, the sending module 503 may be implemented by the output interface 702 in FIG. 11, and the receiving module 501 may be implemented by the input interface 701 in FIG. 11.

It can be understood that FIG. 8 to FIG. 11 show only simplified designs of the first PE device and the second PE device. In actual application, the first PE device and the second PE device each may include any quantity of interfaces, processors, memories, and the like.

Figure 12:
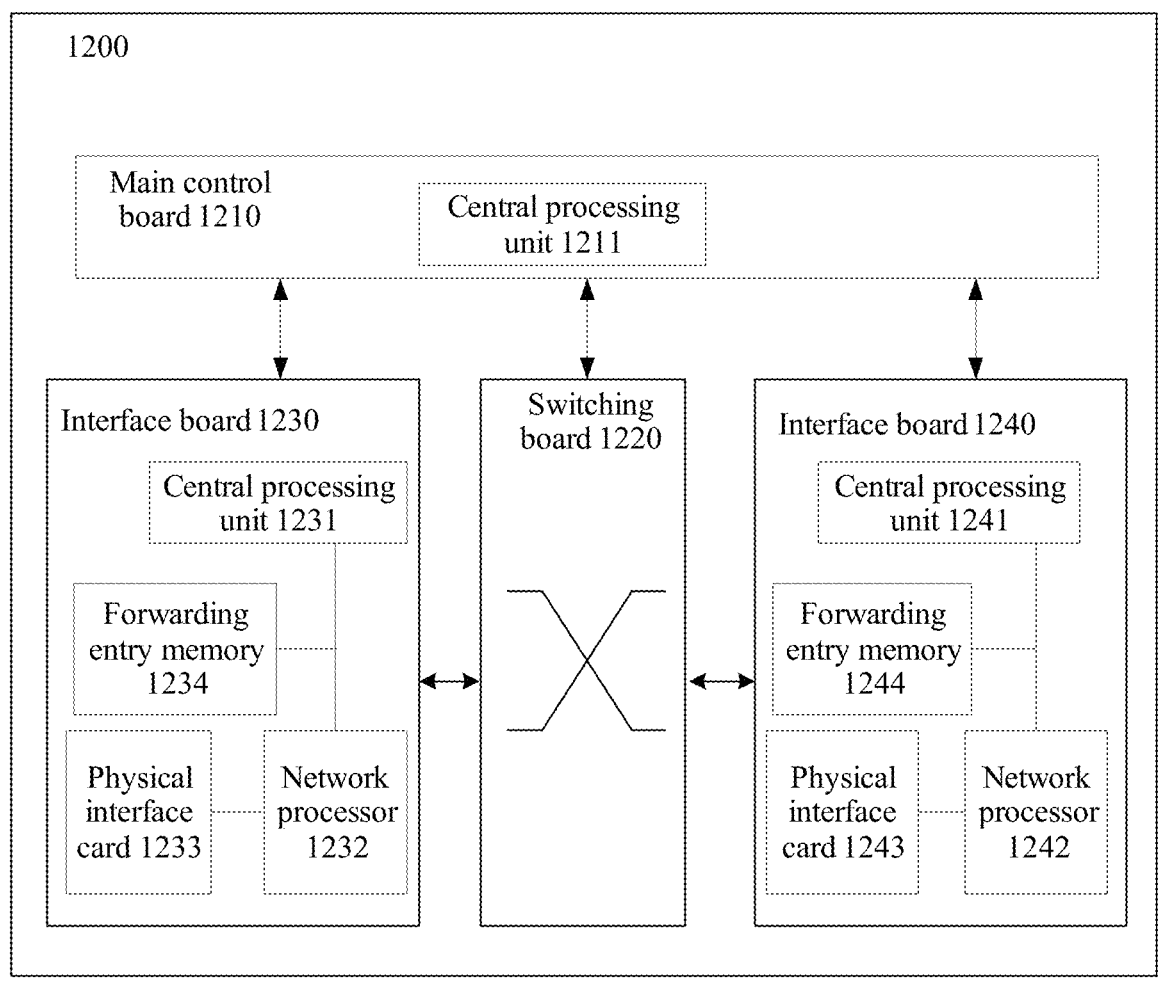
FIG. 12 is a schematic structural diagram of a first PE device according to an embodiment of this application.

FIG. 12 is a schematic diagram of a hardware structure of another first PE device 1200 according to an embodiment of this application. The first PE device 1200 shown in FIG. 12 may be configured to perform corresponding steps performed by the first PE device in the method of the foregoing embodiment.

As shown in FIG. 12, the first PE device includes a main control board 1210, an interface board 1230, a switching board 1220, and an interface board 1240. The main control board 1210 is configured to complete functions such as system management, device maintenance, and protocol processing. The switching board 1220 is configured to exchange data between interface boards (the interface board is also referred to as a line card or a service board). The interface board 1230 and the interface board 1240 are configured to provide various service interfaces (for example, a point of synchronization (POS) interface, a gigabit Ethernet (GE) interface, and an asynchronous transfer mode (ATM) interface) and implement data packet forwarding. Using a system bus, the main control board 1210, the interface board 1230, the interface board 1240, and the switching board 1220 are connected to a platform backboard for interworking. A central processing unit 1231 on the interface board 1230 is configured to: control and manage the interface board; and communicate with a central processing unit on the main control board.

The central processing unit 1211 on the main control board 1210 generates a first message, and sends, using a central processing unit on the interface board 1230, the first message to a second PE device connected to a physical interface card 1233. The first message carries a first MAC/IP advertisement route and a VLAN identifier, the first MAC/IP advertisement route includes a MAC address and an ESI used to identify an ES. The MAC address included in the first MAC/IP advertisement route is a MAC address of the CE device or a MAC address of a terminal device managed by the CE device. The ES includes the first link and the second link, and the VLAN identifier is used to indicate a VLAN to which the MAC address included in the first MAC/IP advertisement route belongs. The first MAC/IP advertisement route and the VLAN identifier are used by the second PE device to generate a first MAC forwarding entry, the first MAC forwarding entry includes the MAC address included in the first MAC/IP advertisement route and the VLAN identifier, and an outbound interface identifier included in the first MAC forwarding entry is an identifier of the second interface. The first MAC forwarding entry is used by the first PE device to forward, to the CE device, a packet whose destination MAC address is the MAC address included in the first MAC/IP advertisement route.

The central processing unit 1211 on the main control board 1210 is further configured to obtain, from the physical interface card 1233 on the interface board 1230, a second message sent by the second PE device. The second message carries a second MAC/IP advertisement route, a next hop network address, and the VLAN identifier. The second MAC/IP advertisement route includes a destination MAC address and the ESI. The destination MAC address in the second MAC/IP advertisement route is the MAC address included in the second MAC/IP advertisement route. The next hop network address carried in the second message is a network address of the second PE device, the ESI is used by the first PE device to determine that the first PE device is connected to the CE device through the first interface. The determined first interface, the MAC address included in the second MAC/IP advertisement route, and the VLAN identifier are used by the first PE device to generate a third MAC forwarding entry. The third MAC forwarding entry includes the MAC address included in the second MAC/IP advertisement route, and an outbound interface identifier included in the third MAC forwarding entry is an identifier of the first interface. The third MAC forwarding entry is used by the first PE device to forward a packet whose destination MAC address is the MAC address included in second MAC/IP advertisement route.

The central processing unit 1211 on the main control board 1210 determines, based on the ESI, that the first PE device is connected to the CE device through the first interface; and generates the third MAC forwarding entry based on the determined first interface, the MAC address included in the second MAC/IP advertisement route, and the VLAN identifier. The central processing unit 1211 on the main control board 1210 sends the third MAC forwarding entry to a forwarding entry memory 1234 on the interface board 1230 using the central processing unit 1231 on the interface board 1230.

The forwarding entry memory 1234 on the interface board 1230 is configured to store the third MAC forwarding entry. The central processing unit 1231 on the interface board 1230 is configured to control a network memory 1232 to obtain a MAC forwarding entry in the forwarding entry memory 1234. In addition, the central processing unit 1231 is configured to control the network memory 1232 to receive and forward traffic using the physical interface card 1233.

It should be understood that an operation on the interface board 1240 is consistent with an operation on the interface board 1230 in this embodiment of this application. For brevity, details are not described again. It should be understood that the first PE device 1200 in this embodiment may correspond to functions and/or steps implemented in the foregoing method embodiments. For brevity, details are not described herein again.

In addition, it should be noted that, in this application, the second PE device may have a same structure as the first PE device. The PE device may include one or more main control boards, and the plurality of main control boards may include a primary main control board and a secondary main control board. There may be one or more interface boards, and the first PE device with a stronger data processing capability provides more interface boards. There may be one or more physical interface cards on the interface board. There may be no switching board, or there may be one or more switching boards. When there are a plurality of switching boards, load sharing and redundancy backup may be jointly implemented. In a centralized forwarding architecture, the PE device may not need a switching board, and the interface board is responsible for a service data processing function of an entire system. In a distributed forwarding architecture, the PE device may include at least one switching board, and data is exchanged between a plurality of interface boards using the switching board, in order to provide a large-capacity data exchange and processing capability. Therefore, a data access and processing capability of a PE device of a distributed architecture is better than that of a device of a centralized architecture. Use of a specific architecture depends on a specific networking deployment scenario. No limitation is imposed herein.

Figure 13:
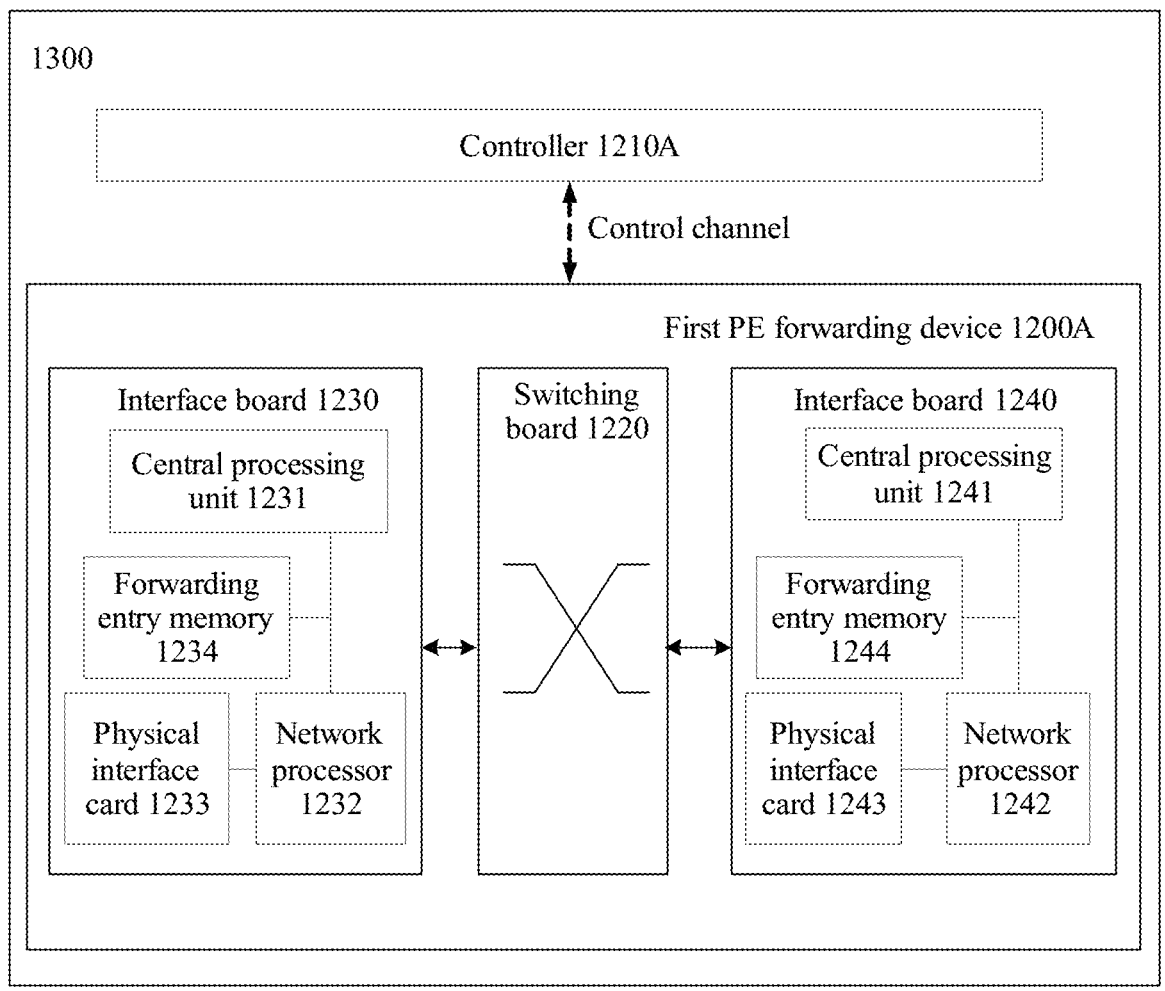
FIG. 13 is a schematic structural diagram of a first PE device according to an embodiment of this application.

FIG. 13 is a schematic diagram of a hardware structure of another first PE device 1300 according to an embodiment of this application. The first PE device 1300 shown in FIG. 13 may be configured to perform corresponding steps performed by the first PE device in the method of the foregoing embodiment.

Such a product form of the first PE device 1300 is applicable to a network architecture (for example, software-defined networking (SDN)) in which control and forwarding are separated. In the SDN, the main control board 1210 of the first PE device 1200 shown in FIG. 12 is separated from the device to form a new independent physical device (namely, a controller 1210A shown in FIG. 13), and remaining components form another independent physical device (namely, a first PE forwarding device 1200A shown in FIG. 13). The controller 1210A interacts with the first PE forwarding device 1200A using a control channel protocol. The control channel protocol may be the OpenFlow Protocol, the Path Computation Element Communication Protocol (PCEP), the BGP, the Interface to the Routing System (I2RS), or the like. In other words, the first PE device 1300 in this embodiment compared with the embodiment corresponding to FIG. 12 includes the controller 1210A and the first PE forwarding device 1200A that are separated. In other words, in this embodiment, the first PE device 1300 may also be considered as a system.

The controller 1210A may be implemented based on a general-purpose physical server or a dedicated hardware structure. In a design example, the controller includes a receiver, a processor, a transmitter, a random access memory (RAM), a read-only memory (ROM), and a bus (not shown in the figure). The processor is separately coupled to the receiver, the transmitter, the RAM, and the ROM using the bus. When the controller needs to run, a basic input/output system (BIOS) built in the ROM or a bootloader in an embedded system is used to boot the system to start, and boot the controller to enter a normal running state. After entering the normal running state, the controller runs an application and an operating system in the RAM, such that the processor performs all functions and steps of the main control board 1210 in FIG. 12.

The first PE forwarding device 1200A may be implemented based on a dedicated hardware structure. A function and a structure of the first PE forwarding device is consistent with functions and structures of the interface board 1230, the interface board 1240, and the switching board 1220 in FIG. 12, in order to perform corresponding functions and steps. Alternatively, the first PE forwarding device may be a virtual first PE forwarding device implemented based on the general-purpose physical server and a network functions virtualization (NFV) technology, and the virtual first PE forwarding device is a virtual router. In a scenario of the virtual first PE forwarding device, the interface board, the switching board, and the processor that are included in the foregoing physical first PE forwarding device in the embodiment of the first PE forwarding device can be considered as an interface resource, a network resource, and a processing resource that are allocated by the physical first PE forwarding device to the virtual first PE forwarding device using a general-purpose physical server in a virtual environment. For details of implementing functions or steps of the first PE forwarding device using the general-purpose physical server, or for details of implementing functions or steps of the first PE forwarding device using the general-purpose physical server and the NFV technology, refer to the embodiment in FIG. 10.

It should be understood that, in this embodiment, the controller 1210A and the first PE forwarding device 1200A in the first PE device 1300 may implement various functions and steps implemented by the first PE device in the method embodiments. For brevity, details are not described herein again.

Figure 14:
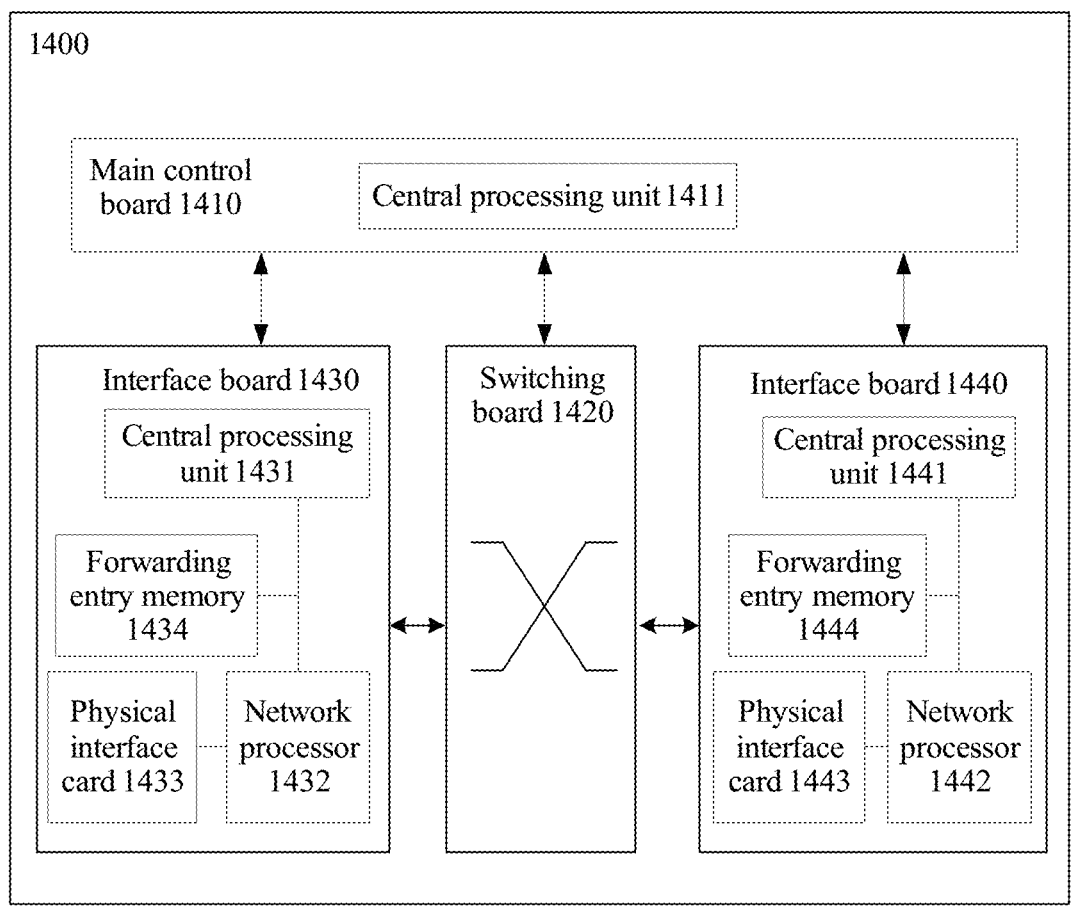
FIG. 14 is a schematic structural diagram of a second PE device according to an embodiment of this application.

FIG. 14 provides a schematic diagram of a hardware structure of another second PE device 1400 according to an embodiment of this application. The second PE device 1400 shown in FIG. 14 may be configured to perform corresponding steps performed by the second PE device in the method of the foregoing embodiment.

As shown in FIG. 14, the second PE device includes a main control board 1410, an interface board 1430, a switching board 1420, and an interface board 1440. The main control board 1410 is configured to complete functions such as system management, device maintenance, and protocol processing. The switching board 1420 is configured to exchange data between interface boards (the interface board is also referred to as a line card or a service board). The interface board 1430 and the interface board 1440 are configured to provide various service interfaces (for example, a POS interface, a GE interface, and an ATM interface) and forward a data packet. Using a system bus, the main control board 1410, the interface board 1430, the interface board 1440, and the switching board 1420 are connected to a platform backboard for interworking. A central processing unit 1431 on the interface board 1430 is configured to: control and manage the interface board; and communicate with a central processing unit on the main control board.

A physical interface card 1433 on the interface board 1430 receives a first message sent by a first PE device, where the first message carries a first MAC/IP advertisement route and a first VLAN identifier, the first MAC/IP advertisement route includes a MAC address and an ESI used to identify an ES, the MAC address included in the first MAC/IP advertisement route is a MAC address of the CE device or a MAC address of a terminal device managed by the CE device, the ES includes the first link and the second link, and the first VLAN identifier is used to indicate a VLAN to which the MAC address included in the first MAC/IP advertisement route belongs. In addition, the first MAC/IP advertisement route and the first VLAN identifier are sent to the central processing unit 1411 on the main control board 1410 using the central processing unit 1431 on the interface board 1430.

The central processing unit 1411 on the main control board 1410 is configured to: obtain the first MAC/IP advertisement route and the first VLAN identifier; and determine, based on the central processing unit 1411 on the main control board 1410 and based on the ESI, that the second PE device is connected to the CE device through the second interface. Further, the central processing unit 1411 generates a first MAC forwarding entry based on the determined second interface, the MAC address included in the first MAC/IP advertisement route, and the first VLAN identifier. The first MAC forwarding entry includes the MAC address included in the first MAC/IP advertisement route and the first VLAN identifier, an outbound interface identifier included in the first MAC forwarding entry is an identifier of the second interface, and the first MAC forwarding entry is used by the second PE device to forward, to the CE device, a packet that carries the first VLAN identifier and whose destination MAC address is the MAC address included in the first MAC/IP advertisement route.

The central processing unit 1411 on the main control board 1410 sends the first MAC forwarding entry to a forwarding entry memory 1434 on the interface board 1430 using the central processing unit 1431 on the interface board 1430.

The forwarding entry memory 1434 on the interface board 1430 is configured to store the first MAC forwarding entry. The central processing unit 1431 on the interface board 1430 is configured to control a network memory 1432 to obtain the MAC forwarding entry in the forwarding entry memory 1434. In addition, the central processing unit 1431 is configured to control the network memory 1432 to receive and send traffic using the physical interface card 1433.

The central processing unit 1411 on the main control board 1410 is further configured to control the interface board 1430 to forward and process traffic.

It should be understood that an operation on the interface board 1440 is consistent with an operation on the interface board 1430 in this embodiment of the present disclosure. For brevity, details are not described again. It should be understood that the second PE device 1400 in this embodiment may correspond to functions and/or steps implemented in the foregoing method embodiments. For brevity, details are not described herein again.

Figure 15:
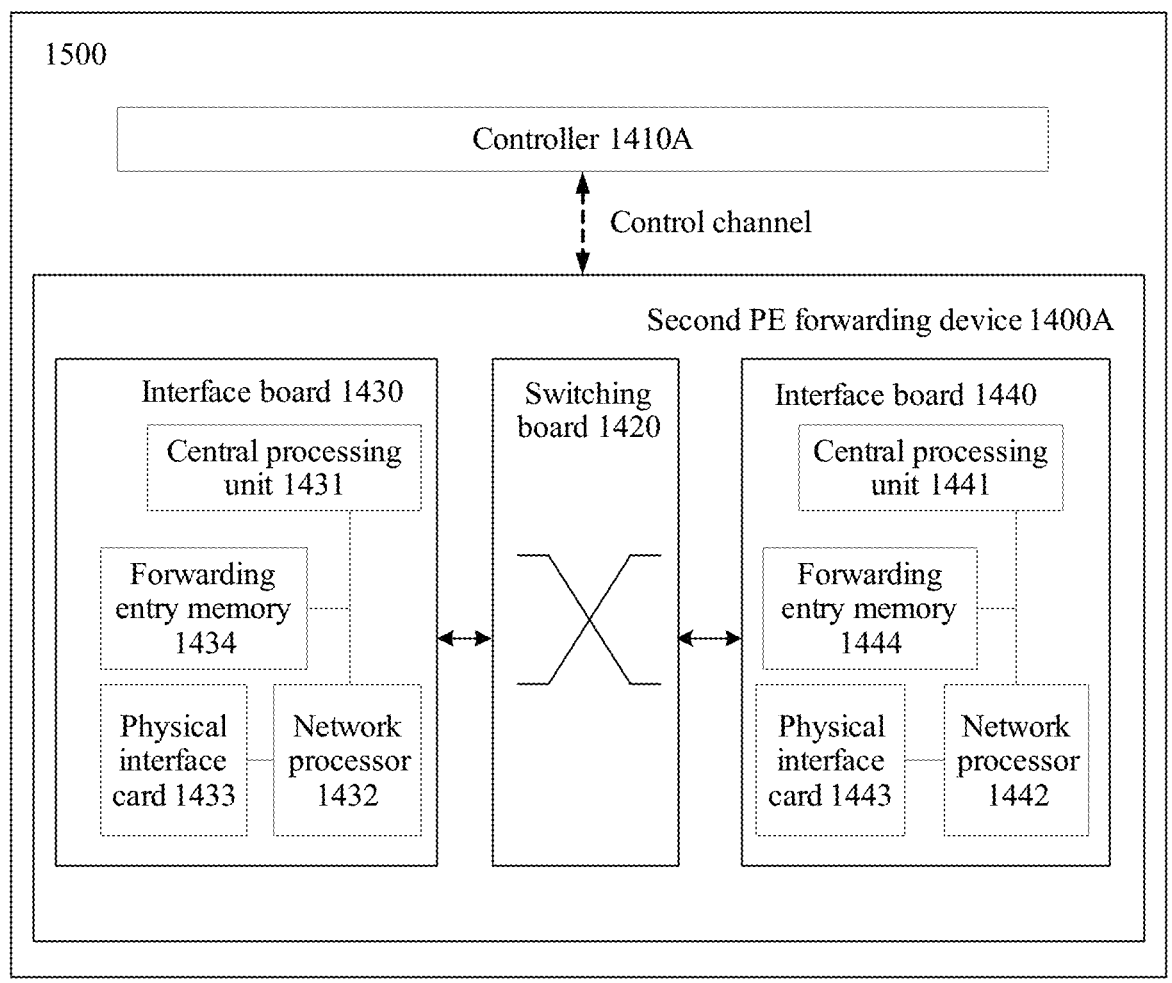
FIG. 15 is a schematic structural diagram of a second PE device according to an embodiment of this application.

FIG. 15 is a schematic diagram of a hardware structure of another second PE device 1500 according to an embodiment of this application. The second PE device 1500 shown in FIG. 15 may be configured to perform corresponding steps performed by the second PE device in the method of the foregoing embodiment.

Such a product form of the second PE device 1500 is applicable to a network architecture (for example, SDN) in which control and forwarding are separated. In the SDN, the main control board 1410 of the second PE device 1400 shown in FIG. 14 is separated from the device to form a new independent physical device (namely, a controller 1410A shown in FIG. 15), and remaining components form another independent physical device (namely, a second PE forwarding device 1400A shown in FIG. 15). The controller 1410A interacts with the second PE forwarding device 1400A using a control channel protocol. The control channel protocol may be the OpenFlow Protocol, the PCEP, the BGP, the I2RS, or the like. In other words, the second PE device 1500 in this embodiment compared with the embodiment corresponding to FIG. 14 includes the controller 1410A and the second PE forwarding device 1400A that are separated. In other words, in this embodiment, the second PE device 1500 may also be considered as a system.

The controller 1410A may be implemented based on a general-purpose physical server or a dedicated hardware structure. In a design example, the controller includes a receiver, a processor, a transmitter, a RAM, a ROM, and a bus (not shown in the figure). The processor is separately coupled to the receiver, the transmitter, the RAM, and the ROM using the bus. When the controller needs to run, a BIOS built in the ROM or a bootloader in an embedded system is used to boot the system to start, and boot the controller to enter a normal running state. After entering the normal running state, the controller runs an application and an operating system in the RAM, such that the processor performs all functions and steps of the main control board 1410 in FIG. 14.

The second PE forwarding device 1400A may be implemented based on a dedicated hardware structure. A function and a structure of the second PE forwarding device is consistent with functions and structures of the interface board 1430, the interface board 1440, and the switching board 1420 in FIG. 14, in order to perform corresponding functions and steps. Alternatively, the second PE forwarding device may be a virtual second PE forwarding device implemented based on the general-purpose physical server and a network functions virtualization (NFV) technology, and the virtual second PE forwarding device is a virtual router. In a scenario of the virtual second PE forwarding device, the interface board, the switching board, and the processor that are included in the foregoing physical second PE forwarding device in the embodiment of the second PE forwarding device can be considered as an interface resource, a network resource, and a processing resource that are allocated by the physical second PE forwarding device to the virtual second PE forwarding device using a general-purpose physical server in a virtual environment. For details of implementing functions or steps of the second PE forwarding device using the general-purpose physical server, or for details of implementing functions or steps of the second PE forwarding device using the general-purpose physical server and the NFV technology, refer to the embodiment in FIG. 11.

It should be understood that, in this embodiment, the controller 1410A and the second PE forwarding device 1400A in the second PE device 1500 may implement various functions and steps implemented by the second PE device in the method embodiments. For brevity, details are not described herein again.

This application further provides a communications system, including a first PE device and a second PE device. The first PE device may be the first PE device provided in the embodiment corresponding to FIG. 8, FIG. 10, FIG. 12, or FIG. 13. The second PE device may be the second PE device provided in the embodiment corresponding to FIG. 9, FIG. 11, FIG. 14, or FIG. 15. The communications system is configured to perform the method 300 in the embodiments corresponding to FIG. 2 to FIG. 7.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, modules and method steps may be implemented by electronic hardware or a combination of computer software and electronic hardware. Whether the functions are performed by hardware or software depends on particular applications and design constraints of the technical solutions. A person skilled in the art can implement the described functions using different methods for each specific application.

It can be clearly understood by a person skilled in the art that, for the purpose of convenient and brief description, for a detailed working process of the foregoing system, apparatus, and module, refer to a corresponding process in the foregoing method embodiments, and details are not described herein again.

All or some of the foregoing embodiments may be implemented through software, hardware, firmware, or any combination thereof. When software is used to implement the embodiments, the embodiments may be implemented fully or partially in a form of a computer program product. The computer program product includes one or more computer instructions. When the computer program instructions are loaded and executed on a computer, the procedure or functions according to the embodiments of this application are fully or partially generated. The computer may be a general-purpose computer, a dedicated computer, a computer network, or other programmable apparatuses. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like. The embodiments in this specification are all described in a progressive manner, for same or similar parts in the embodiments, refer to these embodiments, and each embodiment focuses on a difference from other embodiments. Particularly, apparatus and system embodiments are basically similar to a method embodiment, and therefore are described briefly; for related parts, refer to partial descriptions in the method embodiment.

The foregoing descriptions are merely example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A communication system comprising:
a customer edge (CE) device;
a first provider edge (PE) device comprising a first interface and configured to:
connect to the CE device over a first link and using the first interface;
generate a first Border Gateway Protocol (BGP) message advertising a first medium access control/Internet Protocol (MAC/IP) advertisement route and comprising first network layer reachability information (NLRI) and a first virtual local area network (VLAN) extended community attribute, wherein the first NLRI comprises a MAC address and an Ethernet segment identifier (ESI) identifying an Ethernet segment (ES), wherein the MAC address is of the CE device or of a terminal device managed by the CE device, wherein the ES comprises the first link and a second link, and wherein the first VLAN extended community attribute comprises a first VLAN identifier indicating a VLAN to which the MAC address belongs; and
send the first BGP message; and
a second PE device comprising a second interface and configured to:
connect to the CE device over the second link and using the second interface;

receive the first BGP message from the first PE device; and generate a first MAC forwarding entry comprising the MAC address, the first VLAN identifier, and a first outbound interface identifier identifying the second interface.

2. The communication system of claim 1, wherein the first PE device is further configured to:

receive, from the second PE device and after sending the first BGP message, a second BGP message advertising a second MAC/IP advertisement route and comprising second NLRI, a first next-hop network address, and a second VLAN extended community attribute, wherein the second NLRI comprises the MAC address and the ESI, wherein the first next-hop network address is of the second PE device, and wherein the second VLAN extended community attribute comprises the first VLAN identifier;

generate a second MAC forwarding entry comprising the MAC address, the first VLAN identifier, and a second outbound interface identifier identifying the first interface; and generate a third MAC forwarding entry comprising the MAC address, the first VLAN identifier, and a third outbound interface identifier identifying an outbound interface pointing to the second PE device.

3. The communication system of claim 2, wherein the second BGP message further comprises instruction information instructing the first PE device to refrain from sending, to the second PE device, the first VLAN identifier and a MAC/IP advertisement route that arrives at the MAC address.

4. The communication system of claim 1, wherein the second PE device is further configured to:

receive a first packet comprising a second VLAN identifier and a first destination MAC address that is the MAC address;

replace the second VLAN identifier with the first VLAN identifier to obtain a second packet; and send the second packet to the CE device via the second interface.

5. The communication system of claim 1, wherein the second PE device is further configured to:

generate, after receiving the first BGP message, a second BGP message advertising a second MAC/IP advertisement route and comprising second NLRI, a first next-hop network address, and a second VLAN extended community attribute, wherein the second NLRI comprises the MAC address and the ESI, wherein the first next-hop network address is of the second PE device, and wherein the second VLAN extended community attribute comprises the first VLAN identifier; and send the second BGP message to the first PE device.

6. The communication system of claim 1, wherein the first BGP message further comprises a second next-hop network address of the first PE device, and wherein the second PE device is further configured to generate, based on the MAC address and the second next-hop network address, a second MAC forwarding entry comprising the MAC address and a fourth outbound interface identifier identifying an outbound interface pointing to the first PE device.

7. A method implemented by a second provider edge (PE) device and comprising:

receiving, from a first PE device, a first Border Gateway Protocol (BGP) message advertising a first medium access control/Internet Protocol (MAC/IP) advertisement route and comprising first network layer reachability information (NLRI) and a first virtual local area network (VLAN) extended community attribute, wherein the first NLRI comprises a MAC address and an Ethernet segment identifier (ESI) identifying an Ethernet segment (ES), wherein the MAC address is of a customer edge (CE) device or of a terminal device managed by the CE device, wherein the ES comprises a first link connecting the first PE device and the CE device and comprises a second link connecting a second PE device and the CE device, and wherein the first VLAN extended community attribute comprises a first VLAN identifier indicating a VLAN to which the MAC address belongs; and generating a first MAC forwarding entry comprising the MAC address, the first VLAN identifier, and a first outbound interface identifier identifying a second interface of the second PE device.

8. The method of claim 7, wherein the first BGP message further comprises a next-hop network address of the first PE device, and wherein the method further comprises generating a second MAC forwarding entry comprising the MAC address and a second outbound interface identifier identifying an outbound interface pointing to the first PE device.

9. The method of claim 7, wherein after generating the first MAC forwarding entry, the method further comprises:

receiving a first packet comprising a second VLAN identifier and a destination MAC address that is the MAC address;

replacing the second VLAN identifier with the first VLAN identifier to obtain a second packet; and sending the second packet to the CE device via the second interface.

10. The method of claim 7, wherein after receiving the first BGP message from the first PE device, the method further comprises:

generating a second BGP message comprising second NLRI, a second next-hop network address of the first PE device, and a second VLAN extended community attribute, wherein the second NLRI comprises the MAC address and the ESI, and wherein the second VLAN extended community attribute comprises the first VLAN identifier; and sending the second BGP message to the first PE device.

11. The method of claim 10, wherein the second BGP message further comprises instruction information instructing the first PE device to refrain from sending, to the second PE device, the first VLAN identifier and a MAC/IP advertisement route that arrives at the MAC address.

12. A first provider edge (PE) device comprising:

a memory configured to store instructions; and a processor coupled to the memory and configured to execute the instructions to cause the first PE device to:

generate a first Border Gateway Protocol (BGP) message advertising a first medium access control/Internet Protocol (MAC/IP) advertisement route comprising first network layer reachability information (NLRI) and a first virtual local area network (VLAN) extended community attribute, wherein the first NLRI comprises a MAC address and an Ethernet segment identifier (ESI) identifying an Ethernet segment (ES), wherein the MAC address is of a customer edge (CE) device or of a terminal device managed by the CE device, wherein the ES comprises a first link connecting the first PE device and the CE device and comprises a second link connecting a second PE device and the CE device, and wherein the first VLAN extended community attribute comprises a first VLAN identifier indicating a VLAN to which the MAC address belongs; and send the first BGP message to the second PE device.

13. The first PE device of claim 12, wherein the processor is further configured to execute the instructions to cause the first PE device to:

receive, from the second PE device and after sending the first BGP message, a second BGP message advertising a second MAC/IP advertisement route and comprising second NLRI, a first next-hop network address, and a second VLAN extended community attribute, wherein the second NLRI comprises the MAC address and the ESI, wherein the first next-hop network address is of the second PE device, and wherein the second VLAN extended community attribute comprises the first VLAN identifier;

generate a second MAC forwarding entry comprising the MAC address, the first VLAN identifier, and a second outbound interface identifier identifying a first interface of the first PE device; and generate a third MAC forwarding entry comprising the MAC address, the first VLAN identifier, and a third outbound interface identifier identifying an outbound interface pointing to the second PE device.

14. The first PE device of claim 13, wherein the second BGP message further comprises instruction information instructing the first PE device to refrain from sending, to the second PE device, the first VLAN identifier and a MAC/IP advertisement route that arrives at the MAC address.

15. A second provider edge (PE) device comprising:

a memory configured to store instructions; and a processor coupled to the memory and configured to execute the instructions to cause the second PE device to:

receive, from a first PE device, a first Border Gateway Protocol (BGP) message advertising a first medium access control/Internet Protocol (MAC/IP) advertisement route and comprising first network layer reachability information (NLRI) and a first virtual local area network (VLAN) extended community attribute, wherein the NLRI comprises a MAC address and an Ethernet segment identifier (ESI) identifying an Ethernet segment (ES), wherein the MAC address is of a customer edge (CE) device or of a terminal device managed by the CE device, wherein the ES comprises a first link connecting the first PE device and the CE device and comprises a second link connecting a second PE device and the CE device, and wherein the first VLAN extended community attribute comprises a first VLAN identifier indicating a VLAN to which the MAC address belongs; and generate a first MAC forwarding entry comprising the MAC address, the first VLAN identifier, and a first outbound interface identifier identifying a second interface of the second PE device.

16. The second PE device of claim 15, wherein the first BGP message further comprises a next-hop network address of the first PE device, and wherein the processor is further configured to execute the instructions to cause the second PE device to generate a second MAC forwarding entry comprising the MAC address and a second outbound interface identifier identifying an outbound interface pointing to the first PE device.

17. The second PE device of claim 15, wherein the processor is further configured to execute the instructions to cause the second PE device to:

receive a first packet comprising a second VLAN identifier and a destination MAC address that is the MAC address;

replace the second VLAN identifier with the first VLAN identifier to obtain a second packet; and send the second packet to the CE device via the second interface.

18. The second PE device of claim 15, wherein the processor is further configured to execute the instructions to cause the second PE device to:

generate a second BGP message comprising second NLRI, a second next-hop network address of the first PE device, and a second VLAN extended community attribute, wherein the second NLRI comprises the MAC address and the ESI, and wherein the second VLAN extended community attribute comprises the first VLAN identifier; and send the second BGP message to the first PE device.

19. The second PE device of claim 18, wherein the second BGP message further comprises instruction information instructing the first PE device to refrain from sending, to the second PE device, the first VLAN identifier and a MAC/IP advertisement route that arrives at the MAC address.

20. The second PE device of claim 15, wherein the first VLAN identifier comprises a service VLAN (S-VLAN) identifier or a customer VLAN (C-VLAN) identifier.

* * * * *